United States Patent
Takeuchi et al.

(10) Patent No.: US 6,869,210 B2
(45) Date of Patent: Mar. 22, 2005

(54) STORAGE BOX ILLUMINATION DEVICE FOR COMPACT VEHICLES

(75) Inventors: Tsutomu Takeuchi, Saitama (JP); Yuji Ono, Saitama (JP); Takayuki Kai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 40 days.

(21) Appl. No.: 10/269,040

(22) Filed: Oct. 11, 2002

(65) Prior Publication Data

US 2003/0112633 A1 Jun. 19, 2003

(30) Foreign Application Priority Data

Oct. 16, 2001 (JP) .................................... 2001-318492

(51) Int. Cl.⁷ .............................. B60Q 3/06; B62J 6/00
(52) U.S. Cl. ....................... 362/496; 362/394; 362/473
(58) Field of Search .............................. 362/154–156, 362/394, 473, 483, 487, 488, 496

(56) References Cited

U.S. PATENT DOCUMENTS

| 3,193,673 A | * | 7/1965 | Herring ..................... 362/496 |
| 4,146,762 A | * | 3/1979 | Peck et al. .................. 362/488 |
| 6,086,131 A | * | 7/2000 | Bingle et al. ............... 362/496 |
| 6,428,191 B2 | * | 8/2002 | Ohura ........................ 362/473 |

FOREIGN PATENT DOCUMENTS

| JP | 02220937 A | * | 9/1990 | ............ B60Q/3/06 |
| JP | 6-15786 Y2 | | 4/1994 | |
| JP | 10-194177 A | | 7/1998 | |

* cited by examiner

*Primary Examiner*—Alan Cariaso
(74) *Attorney, Agent, or Firm*—Birch, Stewart, Kolasch & Birch, LLP

(57) ABSTRACT

A storage box illumination device disposed under the seat of a compact vehicle such as motorcycles. The device provides illuminating to the interior of the storage box when the seat is opened. In an illumination device provided in the storage box to be disposed under the seat of a compact vehicle, an illumination switch for actuating the illumination fixture is provided on the seat closure holding member for holding the seat in the closed state.

12 Claims, 22 Drawing Sheets

STORAGE BOX ILLUMINATION DEVICE FOR COMPACT VEHICLES

BACKGROUND OF THE INVENTION

CROSS-REFERENCE TO RELATED APPLICATIONS

The present application claims priority under 35 USC 119 to Japanese Patent Application No. 2001-318492 filed on Oct. 16, 2001 the entire contents thereof is hereby incorporated by reference.

BACKGROUND OF THE INVENTION

Field of the Invention

The present invention relates to a storage box illumination device disposed under the seat of a compact vehicle such as motorcycles. More specifically, to a device for illuminating the interior of the storage box when the seat is opened.

Description of Background Art

In a compact vehicle of the related art in which the front end portion of the seat is rotatably supported on the front portion of the opening of the storage box so as to cover the upper opening of the storage box by a pivotal movement in the vertical direction, an illumination device was provided for illuminating the interior of the storage box (JP-U-6-15786, JP-A-10-194177).

In such an illumination device, an illumination switch is disposed in the vicinity of the opening of the storage box in order to illuminate the illumination lamp in a state in which the seat is pivoted upwardly and the opening of the storage box is opened. Thus, so that when the seat is moved upwardly and opened, the contact element of the illumination switch is moved upwardly and the illumination switch is turned on, and thus the illumination lamp is illuminated.

In the storage box illumination device for compact vehicles described above, since the position of the illumination switch lies next to the rotatably supported portion of the seat, the stroke of the contact element of the illumination switch is smaller in comparison with the amount of vertical pivotal movement of the distal end of the seat. Thus, there are cases where the illumination device does not work properly in correspondence with the opening and closing operation of the seat due to a fixation error of the illumination switch or the deformation of the opening of the storage box or of the lower edge of the seat.

SUMMARY AND OBJECTS OF THE INVENTION

The present invention relates to an improvement of the storage box illumination device for compact vehicles in which such a disadvantage is overcome. An illumination device is provided in the storage box to be disposed under the seat of a compact vehicle wherein a seat closure holding means for maintaining the seat in the closed state is provided with a illumination switch of the illumination fixture.

In the present invention, the illumination switch is provided on the seat closure holding means provided at the position where a reaction force against a closure of the seat is small, that is, the position away from the rotatably supported position of the seat when the seat is opened to provide necessary illumination in the storage box. Thus, the illumination switch actuates correspondingly and ensures illumination in the storage box without being effected by deformation of the seat or the storage box, or the like.

In addition, according to the arrangement of the present invention, the seat closed position or the seat closure released state are accurately detected. Thus, reliability of the action of the illumination switch is improved.

According to the arrangement of the present invention, reliability of the action of the illumination switch can further be improved by selectively detecting any one of the seat closed state and the seat closure released state accurately.

Further, according to the arrangement of the present invention, the direction of movement of the aforementioned operation cable coincides with the direction of movement of the contact element of the illumination switch. Thus, the accuracy of the action of the illumination switch further increases. Simultaneously, since the aforementioned seat closure holding means is configured generally in the plate shape, and the aforementioned operation cable is laid along the direction thereof, the space occupied by the seat closure holding means provided with the aforementioned illumination switch is reduced, thereby enabling space saving.

Still further, according to the arrangement of the present invention, since the illumination switch and the storage box illumination fixture can be arranged to be adjacent, the wiring may be shortened and the assembling operation may be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
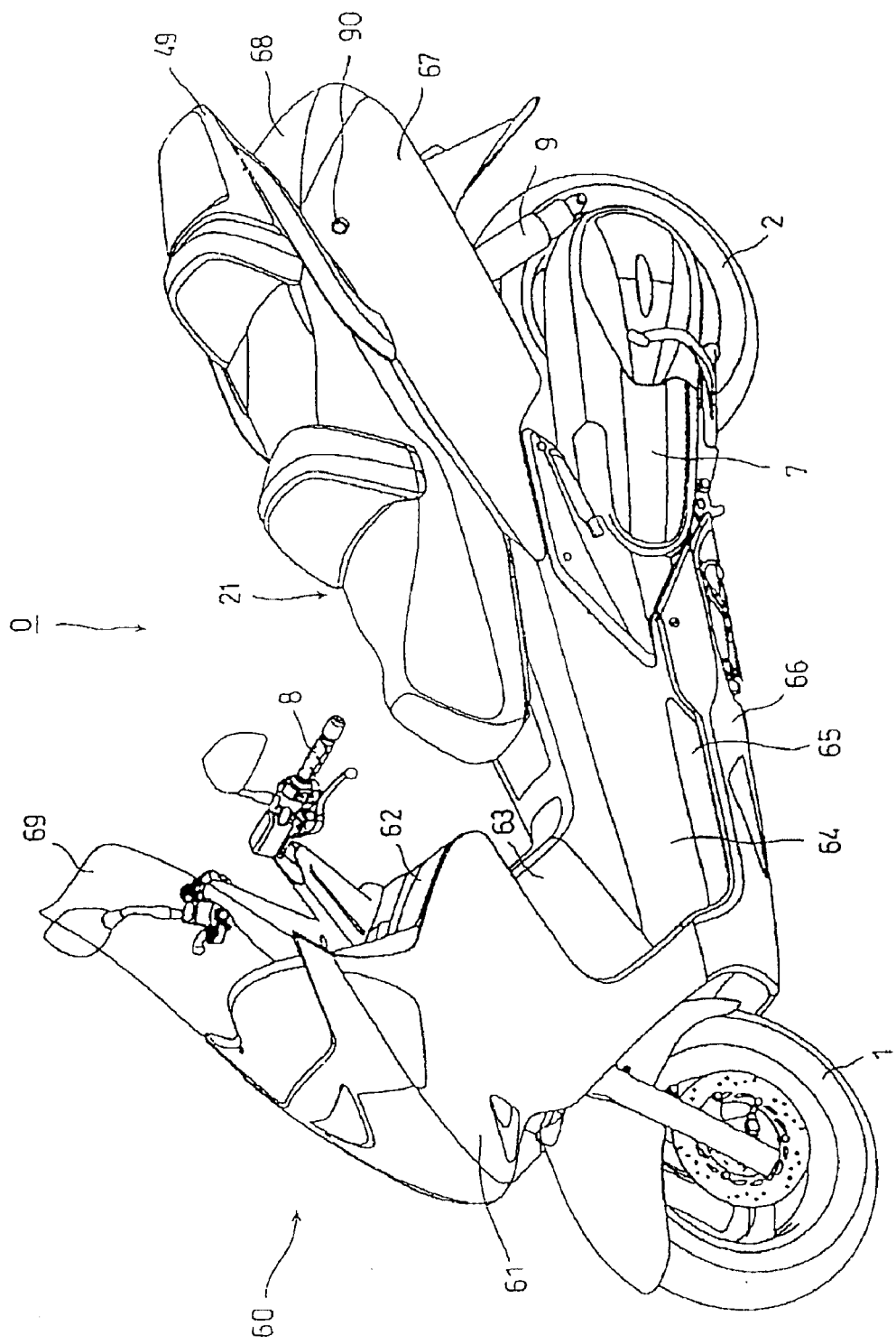
FIG. 1 is a perspective view of a scooter provided with a storage box illumination device for compact vehicles according to the present invention.

An embodiment of the present invention shown in FIG. 1 through FIG. 21 will be described.

In this embodiment, the front, rear, left, right, up, and down refer to the directions based on the rule in which the direction of travel of the motorcycle 0 is designated as the front.

The motorcycle 0, which is a scooter type vehicle, is provided with a front wheel 1 and a rear wheel 2 at the front and rear. The front wheel 1 is rotatably supported at the lower end of the front fork 6 that is bifurcated downwardly from the lower end of the steering shaft 5 fitted on the head pipe 4 of the vehicle body frame 3 so as to be rotatable to the right and left. The aforementioned rear wheel 2 is integrally fitted on the output shaft (not shown) of the power unit 7 supported at the position near the center portion of the vehicle body frame 3 so as to be capable of pivotal movement in the vertical direction, so that the motorcycle 0 can travel by being steered to the left or the right by turning the handle 8 coupled with the steering shaft 5 to the left or the right with the rear wheel 2 being rotated by the driving force of the power unit 7. A rear cushion unit 9 is interposed between the rear portion of the power unit 7 and the rear frame 12 that will be described later.

Figure 3:
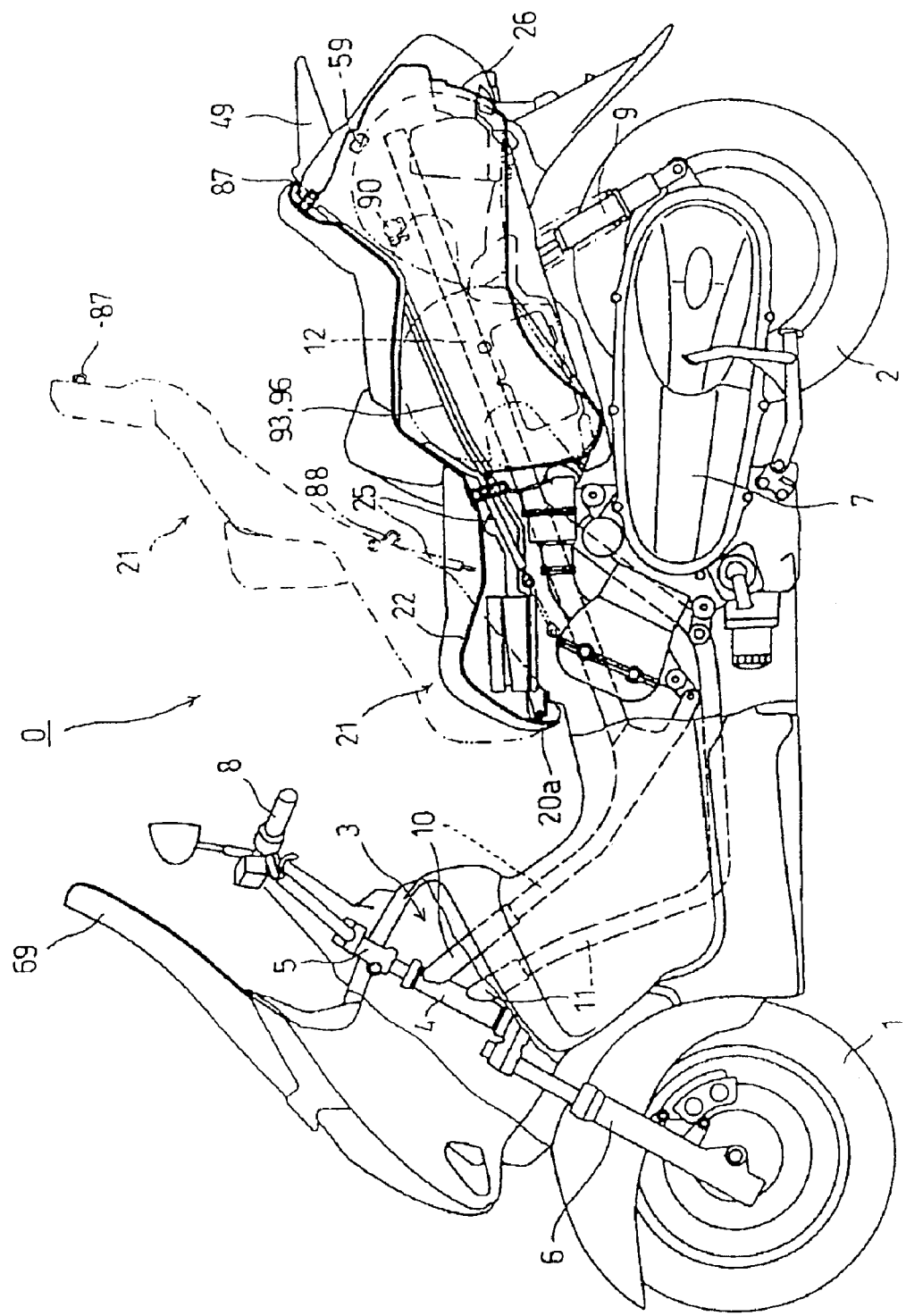
FIG. 3 is a side view of FIG. 1 partially in vertical cross section.

The vehicle body frame 3 is, as shown in FIG. 3, integrally provided with a pair of left and right upper frames 10 extending from the head pipe 4 obliquely downwardly towards the rear, and is integrally provided with a pair of left and right down tubes 11 positioned downwardly of the upper frame 10 and extending obliquely downwardly towards the rear. The lower ends of the aforementioned upper frames 10 are integrally joined to the down tubes 11, and the front ends of the pair of left and right rear frames 12 are integrally connected to the pair of left and right upper frame 10, respectively. The rear portion of the down tube 11 is curved upwardly, and the rear end thereof is joined integrally to the rear frame 12.

Figure 4:
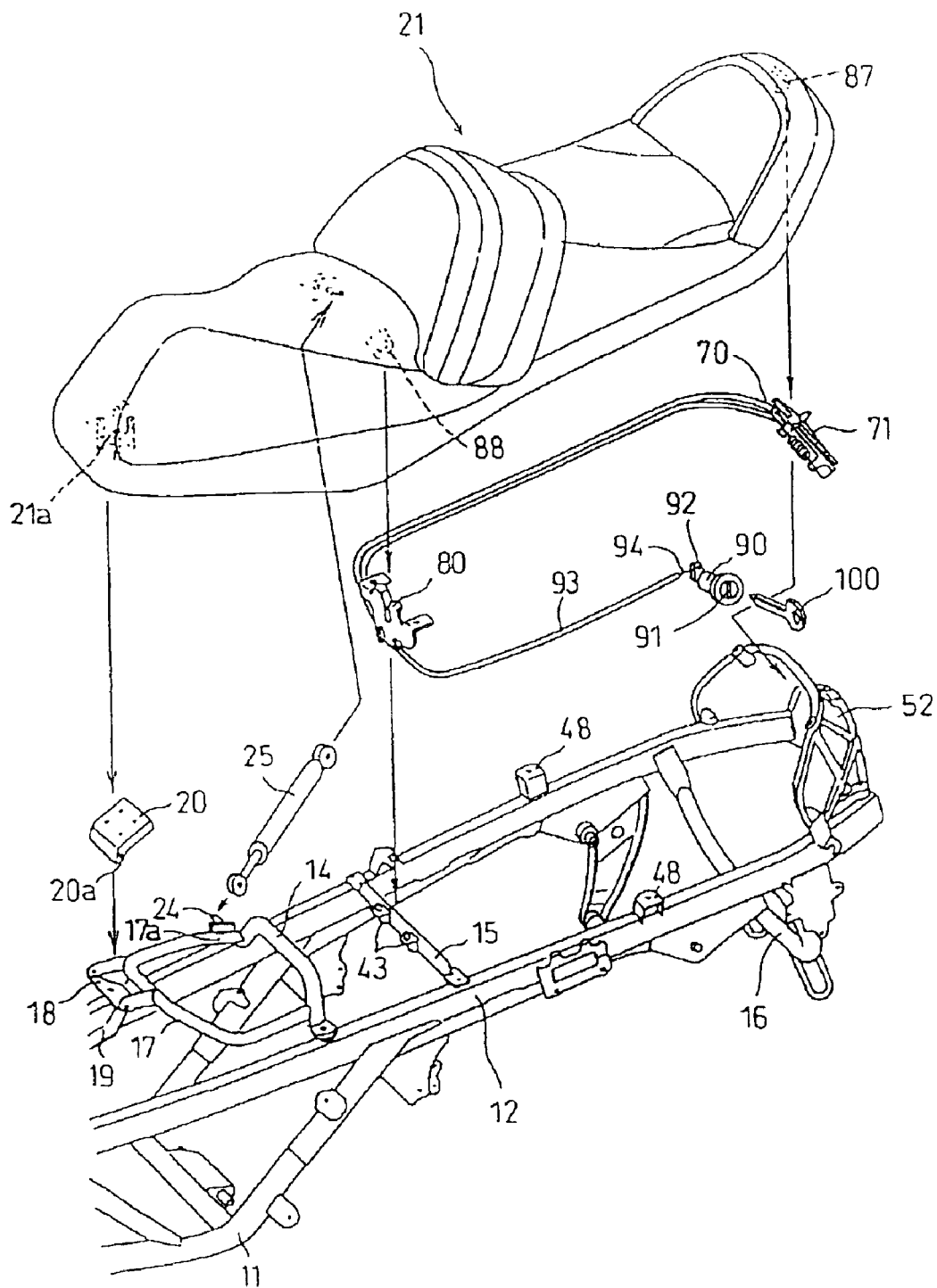
FIG. 4 is an exploded perspective view of a vehicle body frame, a seat, and a locking mechanism with a vehicle body cover and a storage box removed.
Figure 5:
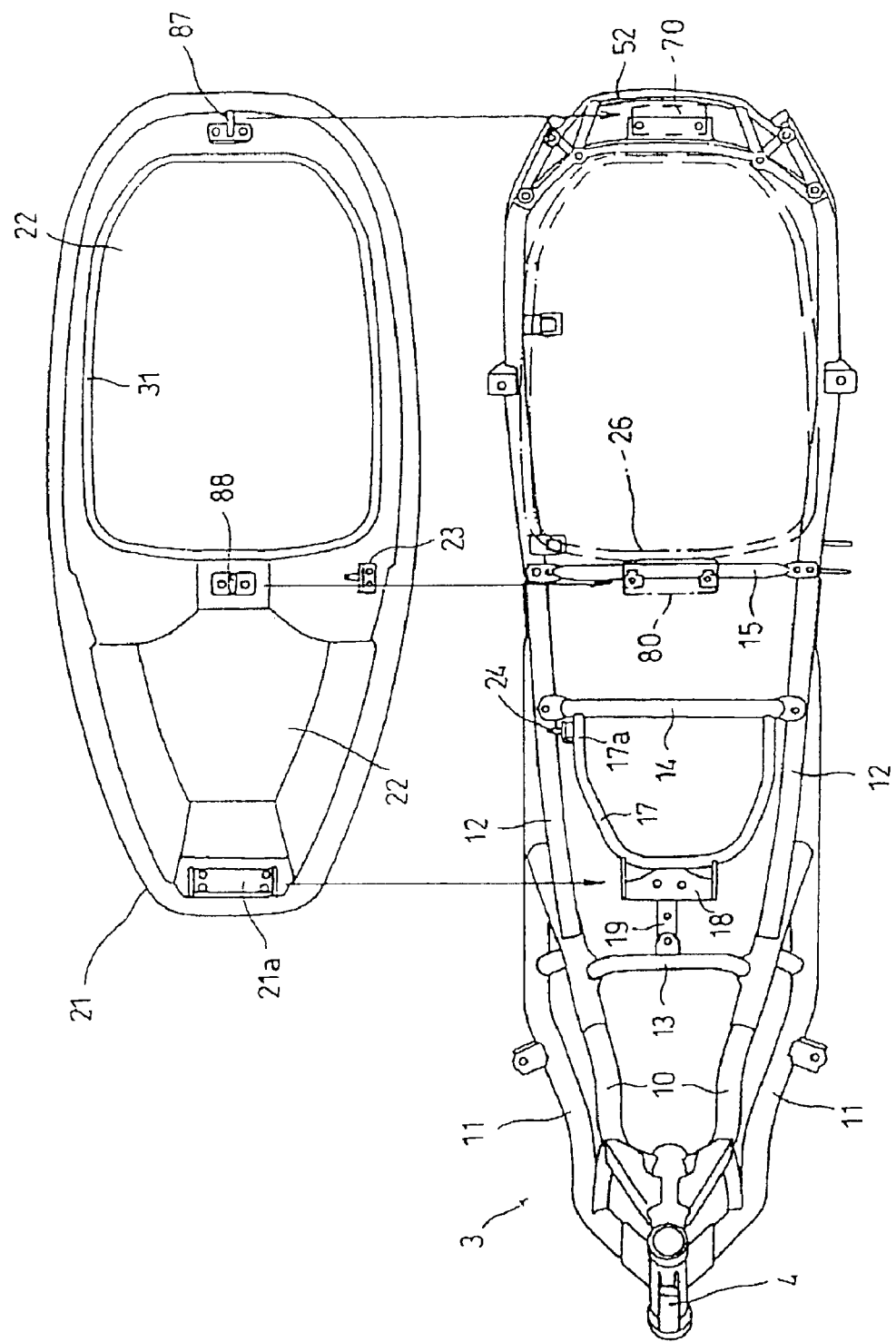
FIG. 5 is a plan view showing the upper surface of the vehicle body frame and the lower surface of the seat.

In addition, as shown in FIG. 4 and FIG. 5, both ends of the first cross member 13, which is an inverted angular U-shape in the front view, are integrally joined to the upper frames 10 at the position adjacent to the joint between the pair of left and right upper frames 10 and the rear frames 12. Both ends of the second cross member 14, which is an inverted angular U-shape in the front view, are integrally joined to the rear frames 12 at a position rearwardly thereof. A linear third cross member 15 is detachably fitted on the rear frames 12 by means of a bolt at the position rearwardly of the second cross member 14, and a fourth cross member 16 is detachably fitted to the rear ends of the rear frames 12 by a bolt.

In addition, as shown in FIG. 4 and FIG. 5, the U-shaped stay 17 is integrally joined to the aforementioned second cross member 14 with both ends thereof faced towards the rear, and both side portions of a seat hinge supporting strip 18 are integrally joined to the front portion of the U-shaped stay 17. The rear end of the extension member 19 are joined integrally to the seat hinge supporting strip 18 at the widthwise center of the vehicle so as to extend obliquely downwardly towards the front. The front end of the extension member 19 is integrally joined to the aforementioned first cross member 13 at the widthwise center of the vehicle. A portion of the seat hinge 20 is integrally joined to the aforementioned seat hinge supporting strip 18 and the front lower end strip 21*a* of the seat 21 is integrally joined to the other portion of the seat hinge 20, so that the seat 21 is supported by the seat hinge supporting strip 18 so as to be capable of a pivotal movement in the vertical direction about the axis 20*a* of the seat hinge 20.

In addition, as shown in FIG. 5, a seat side bracket 23 is integrally attached to the inner surface of the right side wall (left side wall in FIG. 5 because the seat 21 is inverted) positioned at the substantially longitudinally center of the seat bottom plate 22 of the seat 21, and the vehicle body side bracket 24 is integrally attached to the right base portion 17*a* of the U-shaped stay 17. Brackets 25*a*, 25*b* of the damper 25 are rotatably attached to both of the seat side bracket 23 and the vehicle body side bracket 24, so that the seat 21 is held in the opened state due to a resilient restoring force of the aforementioned damper 25 even when the aforementioned seat 21 is popped up and then is almost pivoted downward by its own weight.

Figure 8:
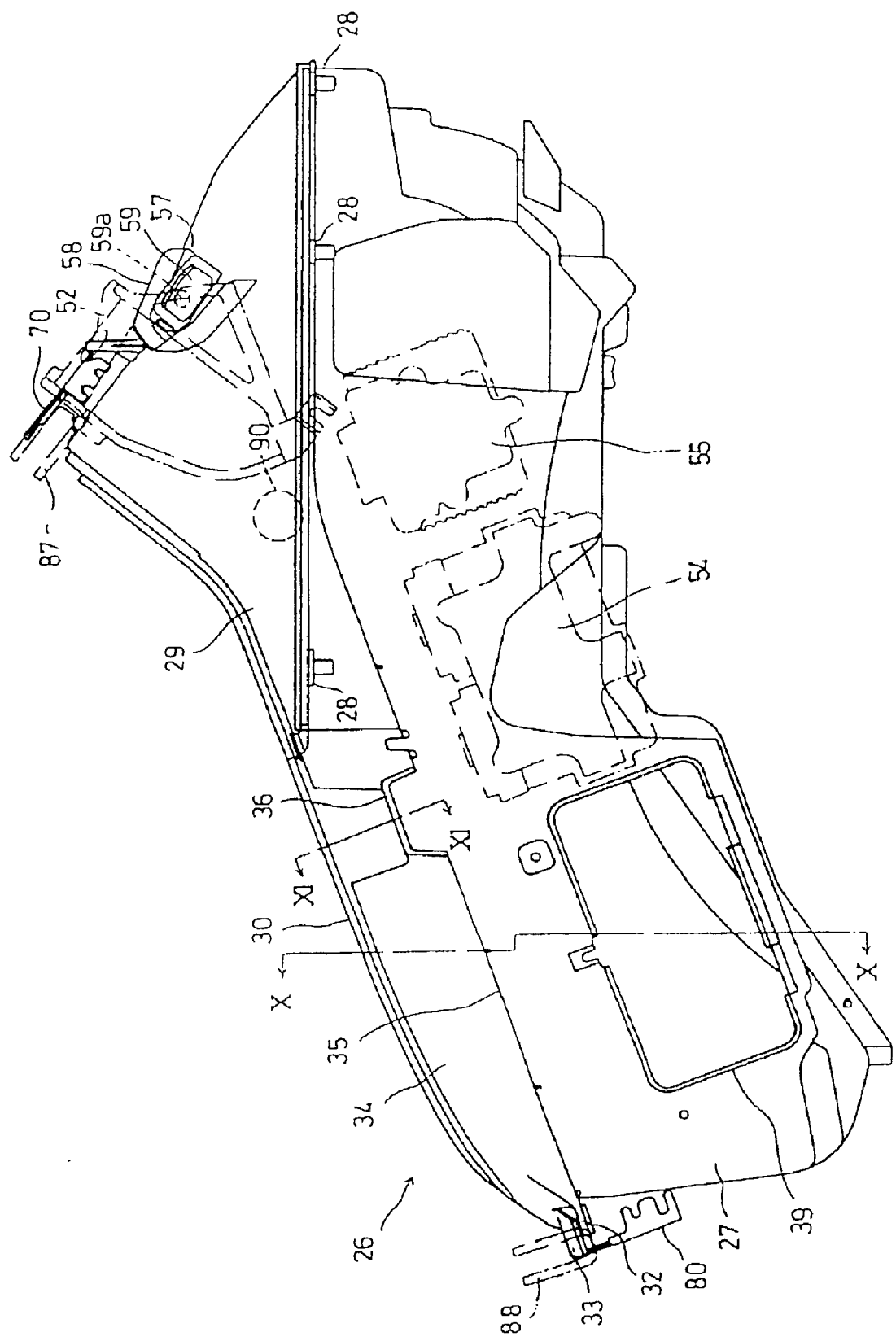
FIG. 8 is a side view of the storage box.
Figure 9:
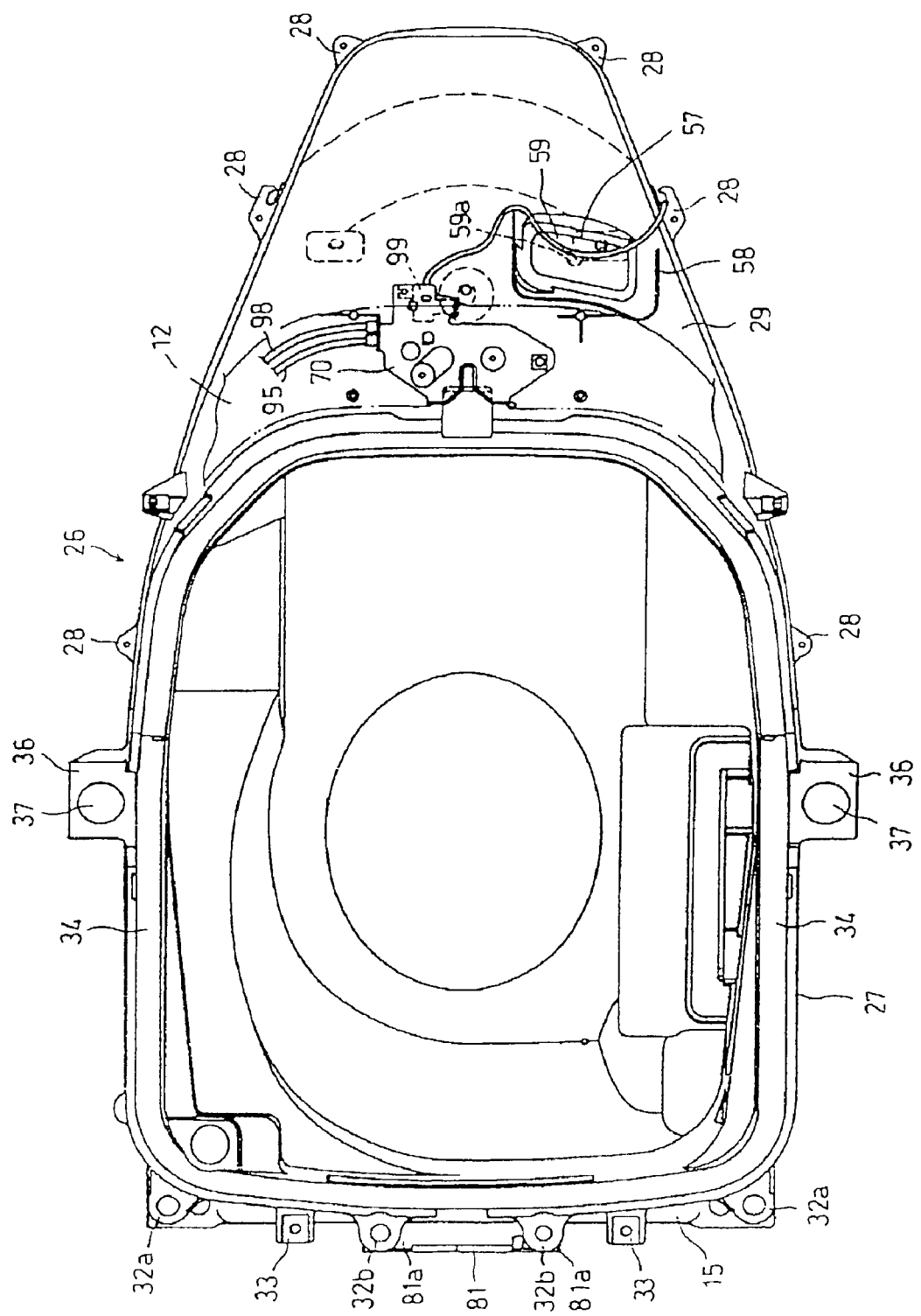
FIG. 9 is a plan view of FIG. 8.

As shown in FIG. 8 and FIG. 9, the helmet storage box 26 includes a box body portion 27 opened on top, and a box upper rear portion 29 to be integrally attached to the mounting projections 28 provided on both left and right side portions of the rear opening of the box body portion 27 by means of screws (not shown). An annular rubber sealing member 31 is adhered on the outer peripheral portion of the lower surface of the rear half of the seat bottom plate 22 being in contact with the upper opening edge 30 of the aforementioned helmet storage box 26 for covering the internal storage space in the helmet storage box 26, as shown in FIG. 5. In a state in which the aforementioned seat 21 is pivoted downwardly and hooks 87, 88 are engaged with a main seat catch 70 and a sub seat catch 80 as described later, the sealing member 31 of the seat bottom plate 22 comes into intimate contact with the upper opening edge 30 of the helmet storage box 26 so that the internal storage space of the helmet storage box 26 is hermetically closed by the seat bottom plate 22.

In addition, as shown in FIG. 9, the front edge portion of the opening of the box body portion 27 of the helmet storage box 26 is integrally formed with forwardly projecting mounting strips 32 at four positions being symmetrical with respect to the longitudinal centerline, and mounting strips 33 are integrally formed between each outer mounting strip and inner mounting strip 32 respectively.

Figure 10:
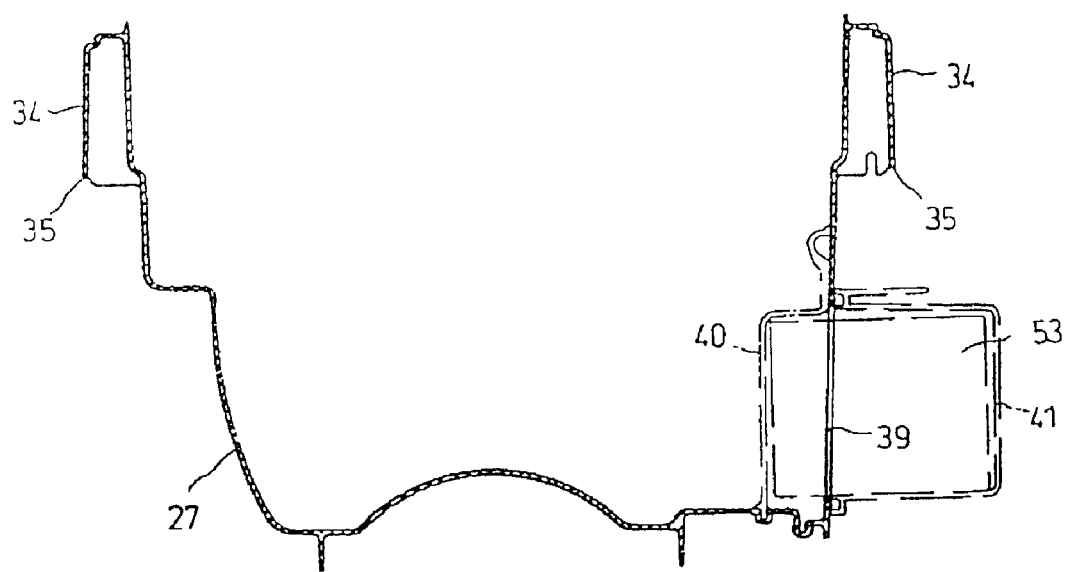
FIG. 10 is a lateral cross section taken along the line X—X in FIG. 8.
Figure 11:
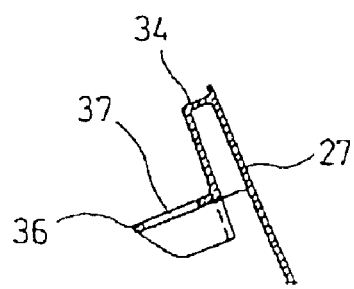
FIG. 11 is a lateral cross section taken along the line XI—XI in FIG. 8.

Further, the upper front half portion 34 on both of the left and right sides of the box body portion 27 of the helmet storage box 26 is, as shown in FIG. 10, bent into an inverted U-shape, and the lower edge of the outer portion 35 thereof is formed so as to be parallel to the upper surface of the rear frame 12. The rear portion of the upper front half portion 34 on both of the left and right sides is, as shown in FIG. 11, formed with an applied part 36 bent towards the outside in the horizontal direction. The applied part 36 is formed with a mounting hole 37, and as shown in FIG. 6, the center of the rear bottom of the aforementioned box body portion 27 is formed with a mounting hole 38.

Figure 6:
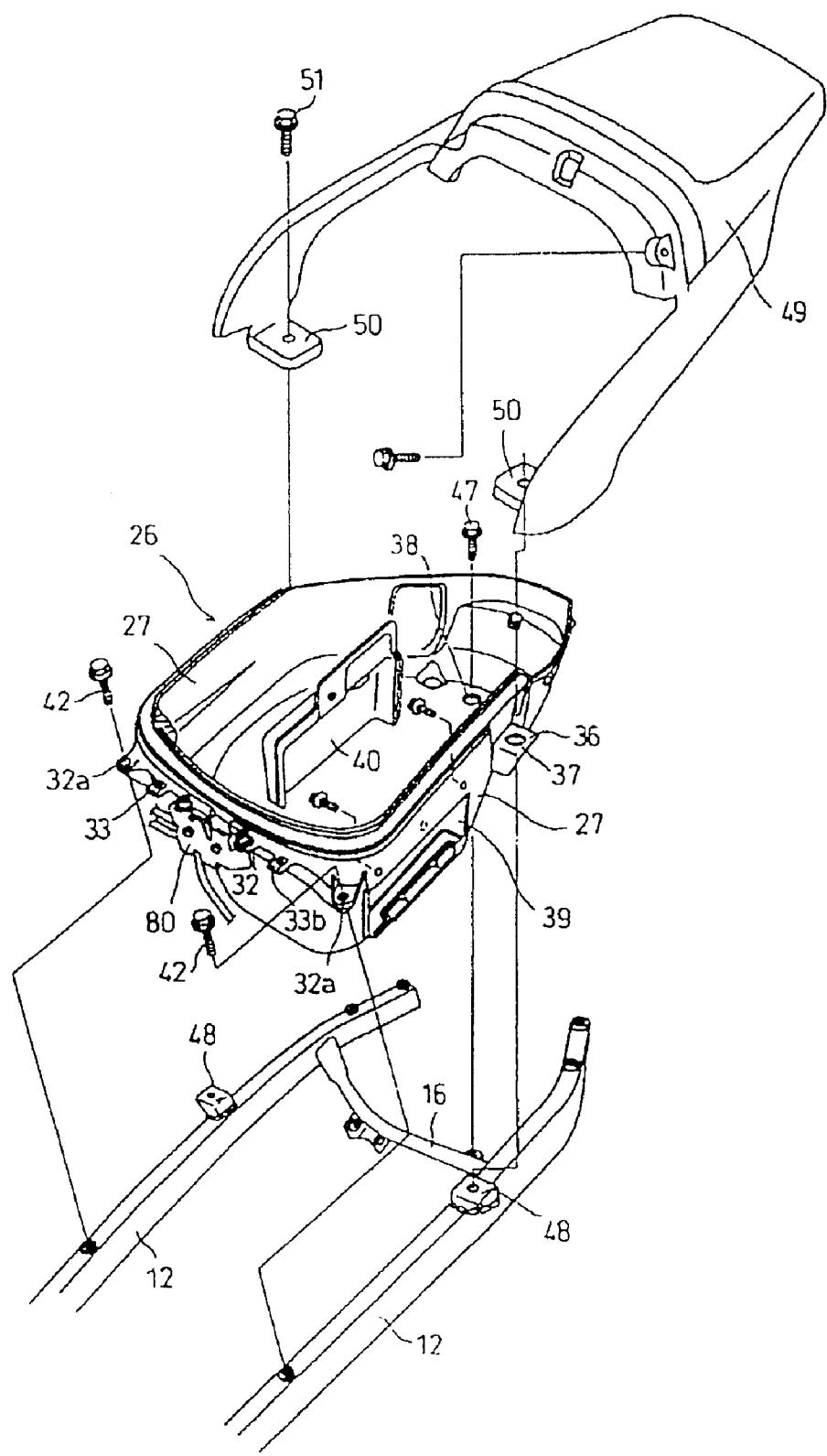
FIG. 6 is an exploded perspective view showing the vehicle body frame, the storage box, and a rear spoiler.

In addition, as shown in FIGS. 6, 8, and 10, an opening 39 is formed on the left front portion of the box body portion 27, a battery cover 40 is attached inside the opening 39, and a battery box 41 is attached outside the opening 39. A battery 53 is placed into the space surrounded by the battery cover 40 and the battery box 41.

The aforementioned helmet storage box 26 is attached on the vehicle body frame 3 in accordance with the procedure shown below.

Figure 7:
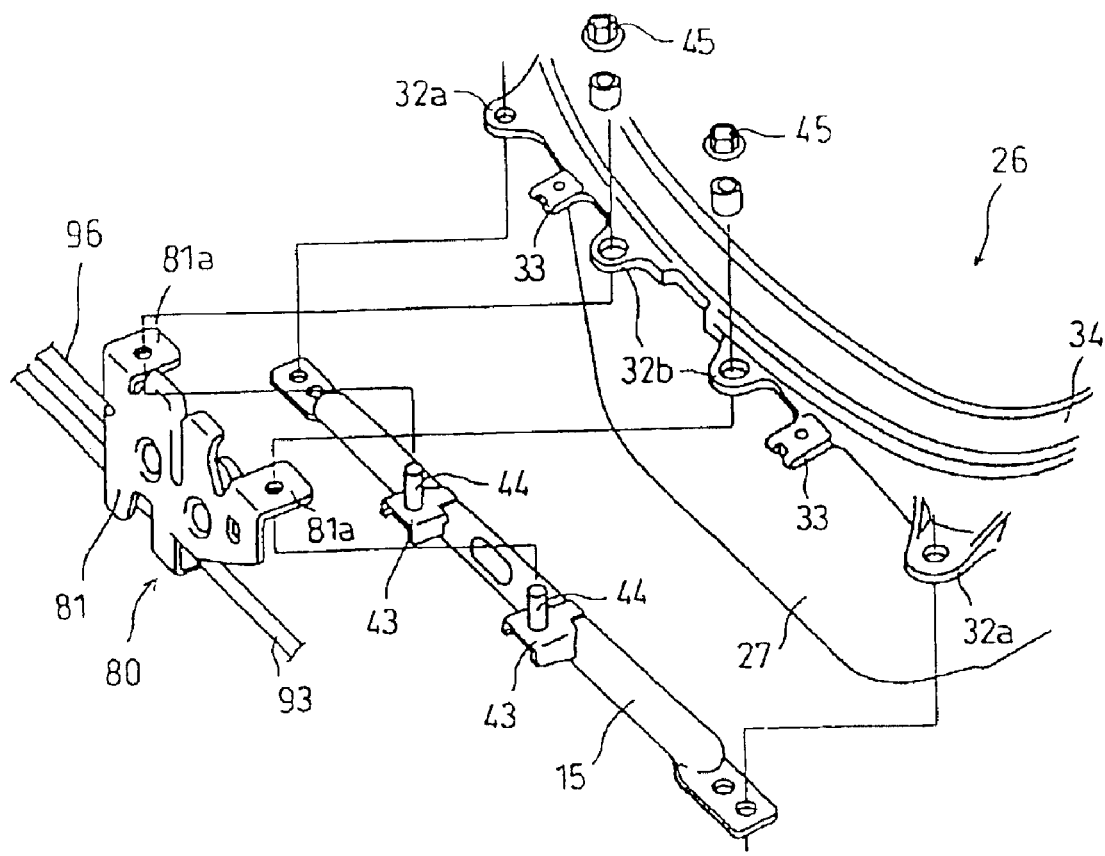
FIG. 7 is an exploded perspective view showing a third cross member, the storage box, and a main seat catch.

As shown in FIG. 6 and FIG. 7, the box body portion 27 of the helmet storage box 26 is put down from above the rear portion of the rear frame 12, and the outer attachment strips 32a out of four attachment strips 32 are fastened on the rear frame 12 together with both ends of the third cross member 15 by means of bolts 42 passing through the attachment strips 32a and the ends of the third cross member 15 from top to bottom and screwed into the rear frame 12 as shown in FIG. 7. The remaining inner attachment strips 32b are placed on the bracket 43 formed integrally with the third cross member 15, and the mounting strip 81a of the housing 81 of the sub seat catch 80, which will be described later, is placed on the inner attachment strips 32b, and then they are fastened to the bracket 43 of the third cross member 15 by means of a bolt 44 passing through the bracket 43, the inner attachment strips 32b, and the mounting strip 81a of the housing 81 and a nut 45 from bottom to top to be screwed thereon.

Subsequently, as shown in FIG. 6, the rear bottom portion of the box body portion 27 is mounted on the fourth cross member 16 by means of a bolt 47 passing through the mounting hole 38 formed at the center of the rear bottom of the box body portion 27 from top to bottom to be screwed on the bracket 46 formed on the fourth cross member 16 at the widthwise center of the vehicle.

Finally, as shown in FIG. 6, the applied part 36 of the box body portion 27 is placed on the bracket 48 formed integrally with the upper surfaces of the rear half portions of the pair of left and right rear frames 12, and the mounting strip 50 of the rear spoiler 49 is mounted on the applied part 36. Thereafter, the rear spoiler 49 and the rear portion of the box body portion 27 are fastened to the rear frame 12 together by means of a bolt 51 passing through the mounting strip 50 and the mounting hole 37 of the applied part 36 from top to bottom to be screwed into the bracket 48.

Prior to attachment of the rear spoiler 49, as shown in FIG. 4, a main seat catch holding portion 52 formed of aluminum die cast with the front portion opened in U-shape is integrally attached on the rear ends of the pair of left and right rear frame 12, and the housing 71 of the main seat catch 70 is detachably mounted on the inner surface, in other words, the front surface, of the main seat catch holding member 52 at the widthwise center of the vehicle.

As shown in FIG. 8, a fuel injection unit 54 for pressurizing fuel and a regulator 55 for adjusting the pressure of fuel in the fuel injection unit 54 are integrally attached on the left rear frame 12 rearwardly of the battery box 41 of the aforementioned helmet storage box 26 in order to inject fuel in the combustion chamber (not shown) in the internal combustion engine of the power unit 7.

As shown in FIG. 1, a vehicle body cover 60 for covering the entire vehicle body frame 3 of the motorcycle 0 includes a front cowl 61 for covering the front portion of the vehicle body frame 3 with the upper cover 62 for covering the upper opening of the front cowl 61 and an inner cover 63 for covering the rear portion of the aforementioned front cowl 61. A center cover 64 extends from the rear end of the inner cover 63 towards the rear for covering the longitudinal center of the vehicle body frame 3. A low deck floor 65 extends outwardly from the outer edge of the lower end of the center cover 64, on which the driver place his feet. A floor skirt 66 extends downwardly from the outer edge of the low deck floor 65. A rear side cover 67 extends from the aforementioned center cover 64 towards the rear for covering the rear side portion of the vehicle frame 3. A rear body cover 68 extends from the rear end of the rear side cover 67 towards the rear for covering the rear portion of the vehicle body frame 3. The wind shield 69 is integrally provided on the upper end of the aforementioned front cowl 61.

Figure 2:
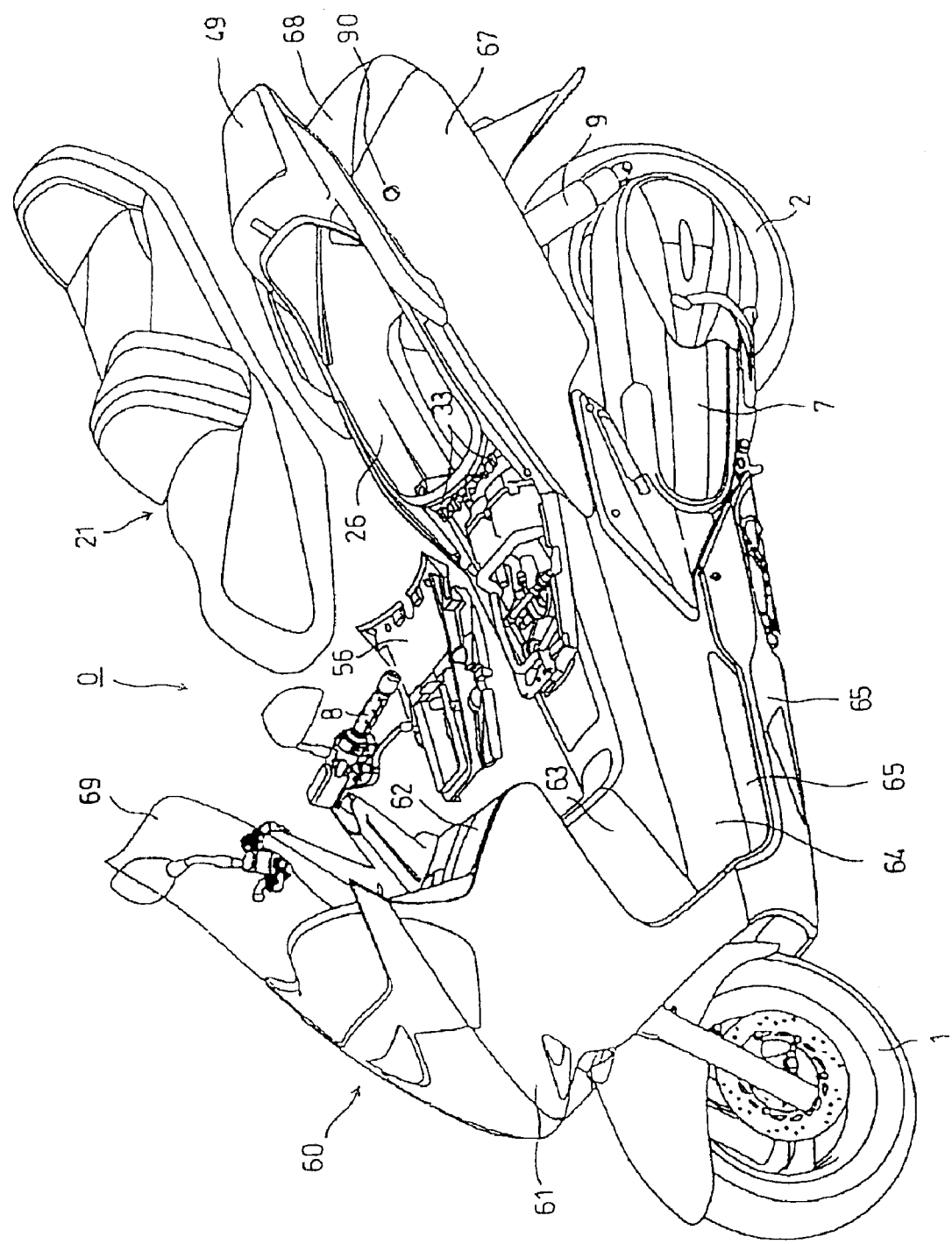
FIG. 2 is a perspective view of FIG. 1 in a state in which the seat and the seat under cover are removed.

Further, the outer edge of the seat under cover 56 shown in FIG. 2 is detachably attached on the pair of left and right mounting strips 33 provided on the front edge portion of the opening on the box body portion 27 of the helmet storage box 26 by means of a screw or the like, not shown, so that it can be disassembled for maintenance or inspection of the auxiliary machinery attached on the internal combustion engine of the power unit 7.

Figure 12A:
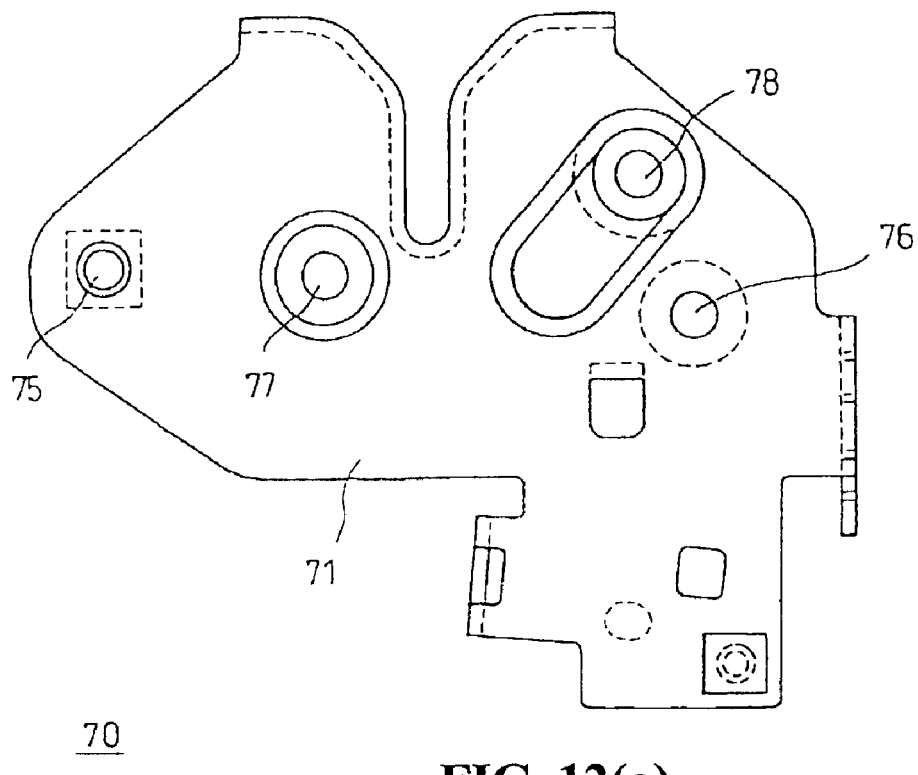
FIGS. 12(a) and 12(b) are exploded back views of a main seat catch.
Figure 12B:
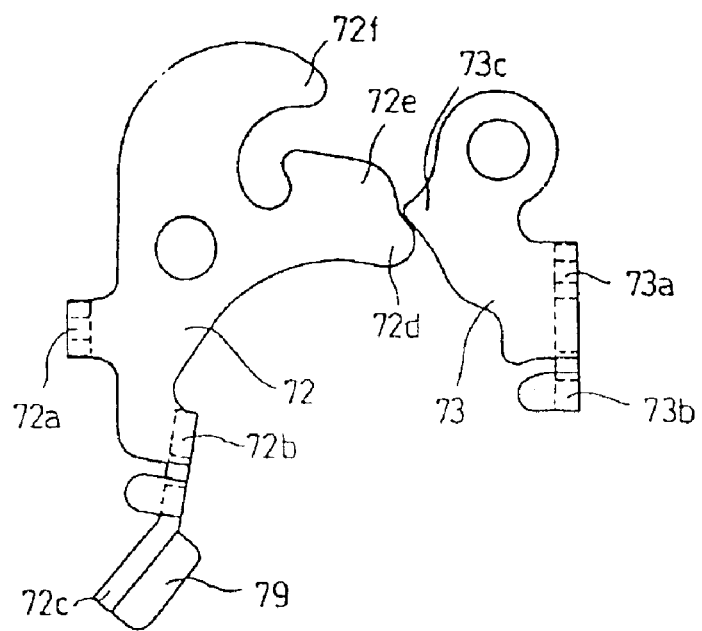
Figure 14:
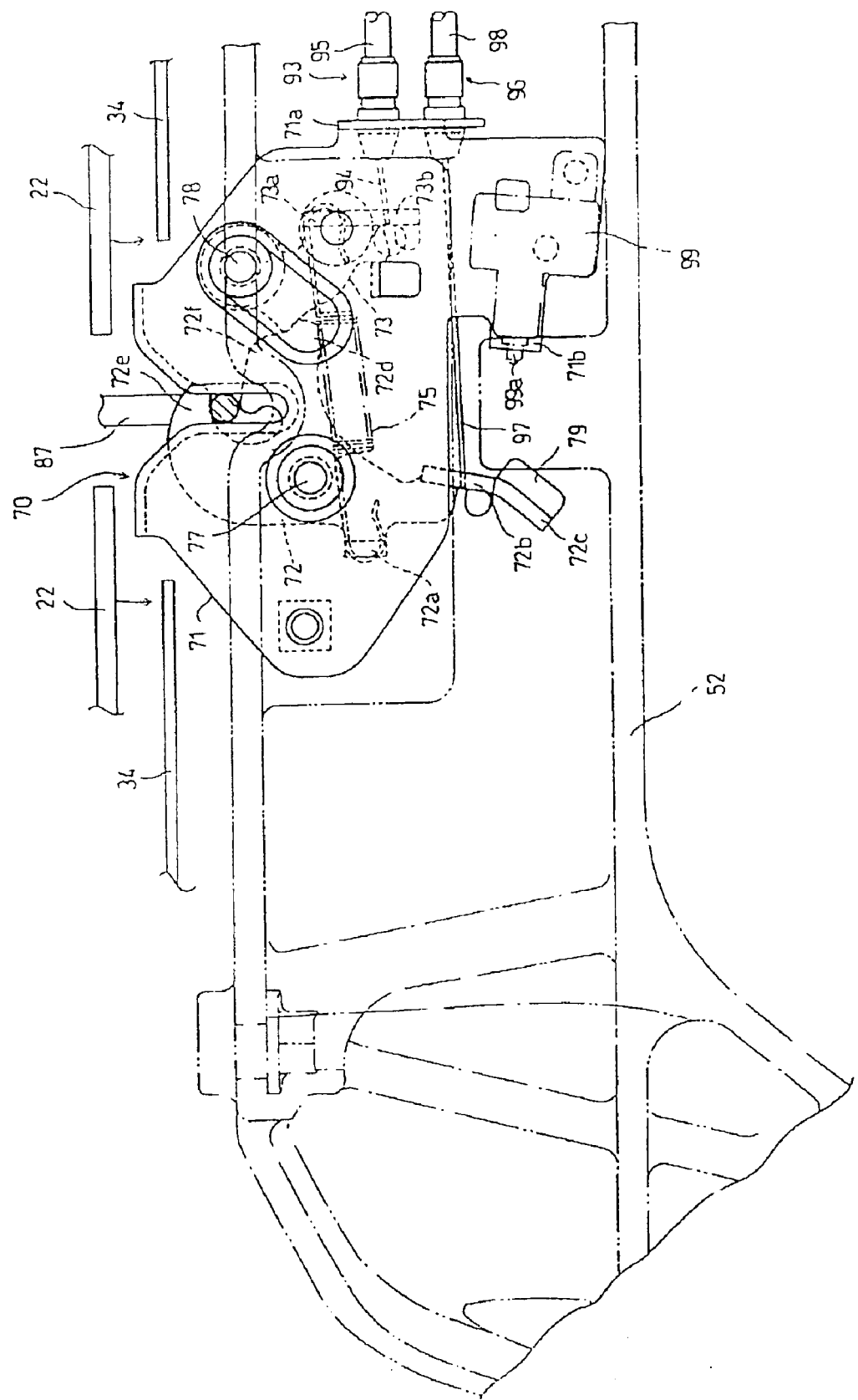
FIG. 14 is a back view of the main seat catch in the locked state.

The aforementioned main seat catch 70 includes, as shown in FIGS. 12(a) and 12(b), a housing 71, a locking claw 72 pivotably attached on one side of the housing 71 via a pin 77 with a stopper member 73 pivotably attached on the other side of the housing 71 via a pin 78. A tension coil spring 74 is provided as shown in FIG. 14 with both ends thereof engaged with the spring catch 72a of the locking claw 72 and the spring catch 73a of the stopper member 73. Bolts 75, 76 are provided for attaching the aforementioned housing 71 integrally to the main seat catch holding member 52. The bolts 75, 76 pass through the main seat catch holding member 52 and the housing 71 is integrally attached to the main seat catch holding member 52 by nuts to be screwed on the tips of the bolts 75, 76, not shown.

Figure 13A:
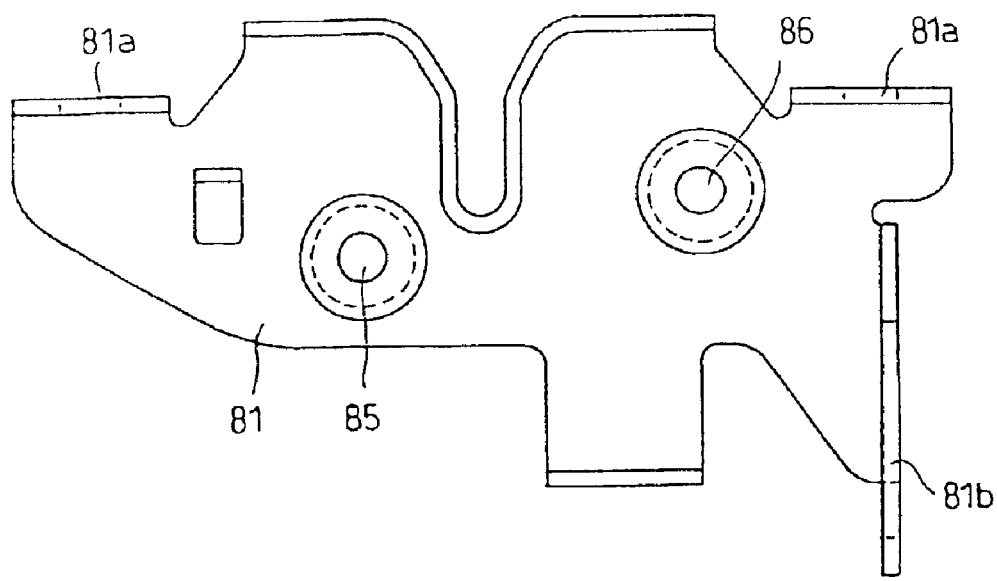
FIGS. 13(a) and 13(b) are exploded back views of a sub seat catch.
Figure 13B:
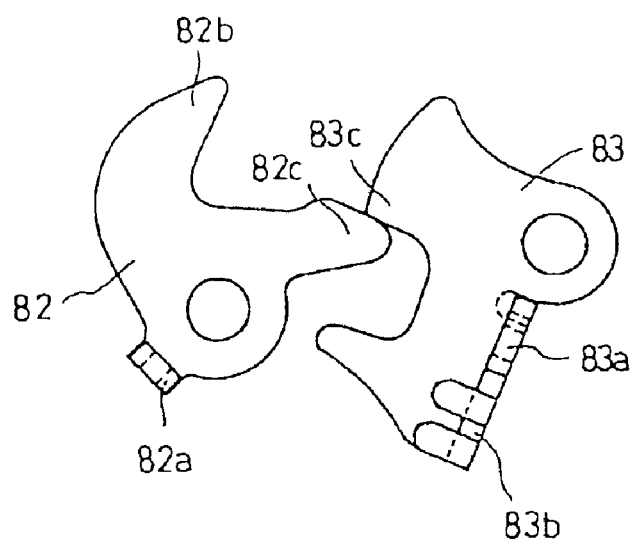
Figure 15:
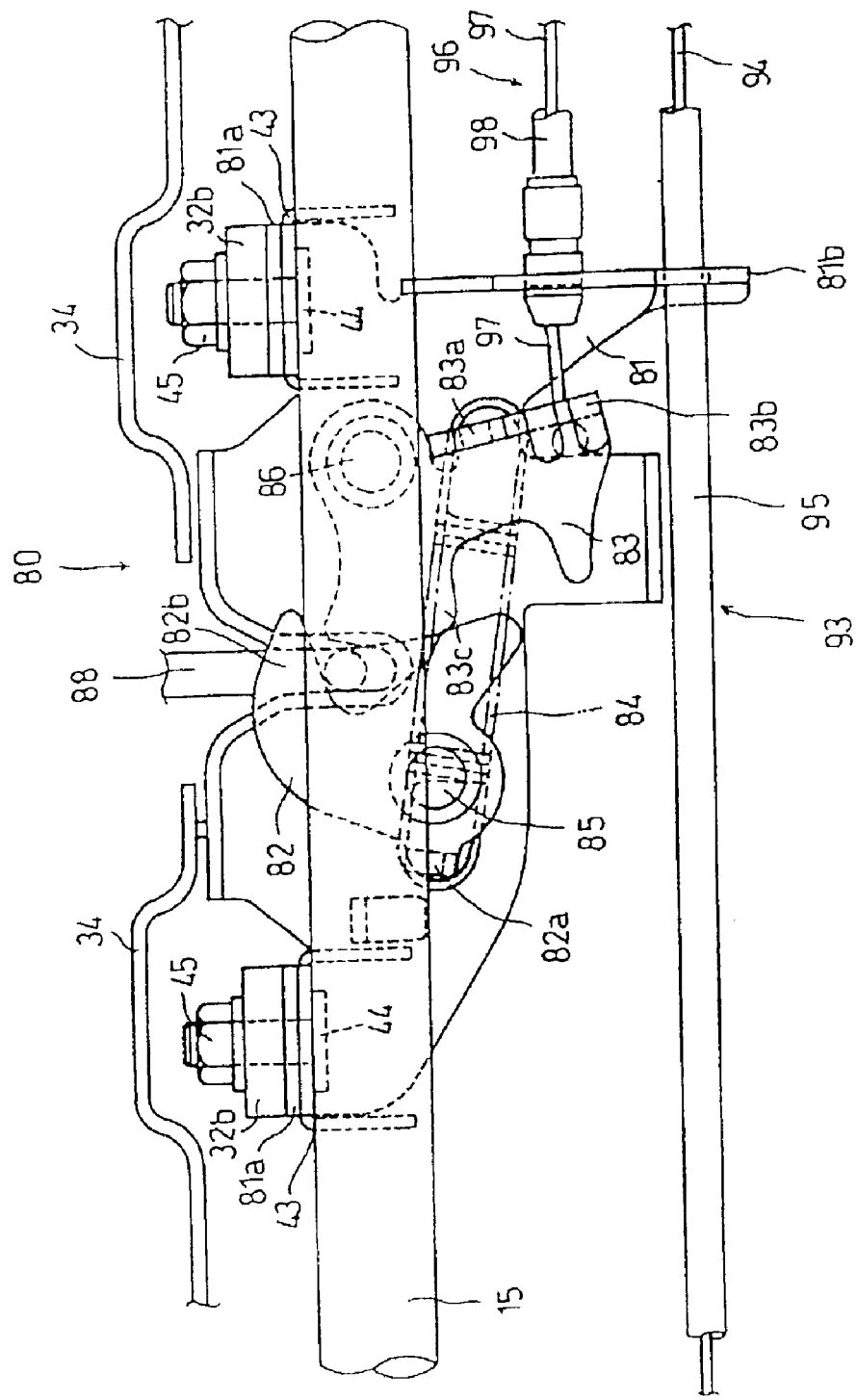
FIG. 15 is a back view of a sub seat catch in the locked state.

The sub seat catch 80 includes, as shown in FIGS. 13(a) and 13(b), a housing 81, a locking claw 82 rotatably attached to one side of the housing 81 via a pin 85, a driving member 83 pivotably attached on the other side of the housing 81 via a pin 86, and a tension coil spring 84 shown in FIG. 15 both ends of which are engaged to the spring catch 82a of the locking claw 82 and the spring catch 83a of the driving member 83.

In addition, as shown in FIG. 4 and FIG. 5, the hooks 87 and 88 to be engaged with the aforementioned main seat catch 70 and the sub seat catch 80, respectively, pass through the rear end of the seat bottom plate 22 at the widthwise center of the vehicle and the substantially longitudinally center portion thereof from bottom to top, and are joined integrally to the seat bottom plate 22 with a nut, not shown, to be screwed on the upper end screw portions of the hooks 87, 88.

Furthermore, as shown in FIG. 1 through FIG. 4, the seat lock 90 is integrally mounted on the portion of the left side rear frame 12 in the vicinity of the rear end with the keyhole 91 of the seat lock 90 exposed towards the outside from the left rear side cover 67. One end of the inner wire 94 of the first cable 93 is joined to the arm portion 92 of the seat lock 90. The outer tube 95 of the first cable 93 passes around the outer periphery of the helmet storage box 26 and then passes through the cable holding bent strip 81b of the housing 81 of the sub seat catch 80. The other end of the outer tube 95 of the first cable 93 is joined to the cable holding bent strip 71a of the housing 71 of the main seat catch 70. The other end of the inner wire 94 of the first cable 93 is connected to the first cable engaging portion 73b of the stopper member 73 of the main seat catch 70. One end of the inner wire 97 of the second cable 96 is joined to the second cable engaging portion 83b of the driving member 83 of the sub seat catch 80, and the other end of the inner wire 97 of the second cable 96 is engaged with the second cable engaging portion 72b of the locking claw 72 of the main seat catch 70. In addition, both ends of the outer tube 98 of the second cable 96 are connected to the cable holding bent strip 81b of the housing 81 of the sub seat catch 80 and the cable holding bent strip 71a of the housing 71 of the main seat catch 70, respectively.

As shown in FIG. 8, an opening 57 is formed on the left upper portion of the upper rear half portion 29 of the helmet storage box 26 and a rib 58 projects from the outer peripheral surface of sides other than the lower side of the opening 57, so that the illumination unit 59 provided with a illumination lamp, not shown, projects from outside into the helmet storage box 26 and is adapted to be detachably attached to the aforementioned opening 57.

Figure 16:
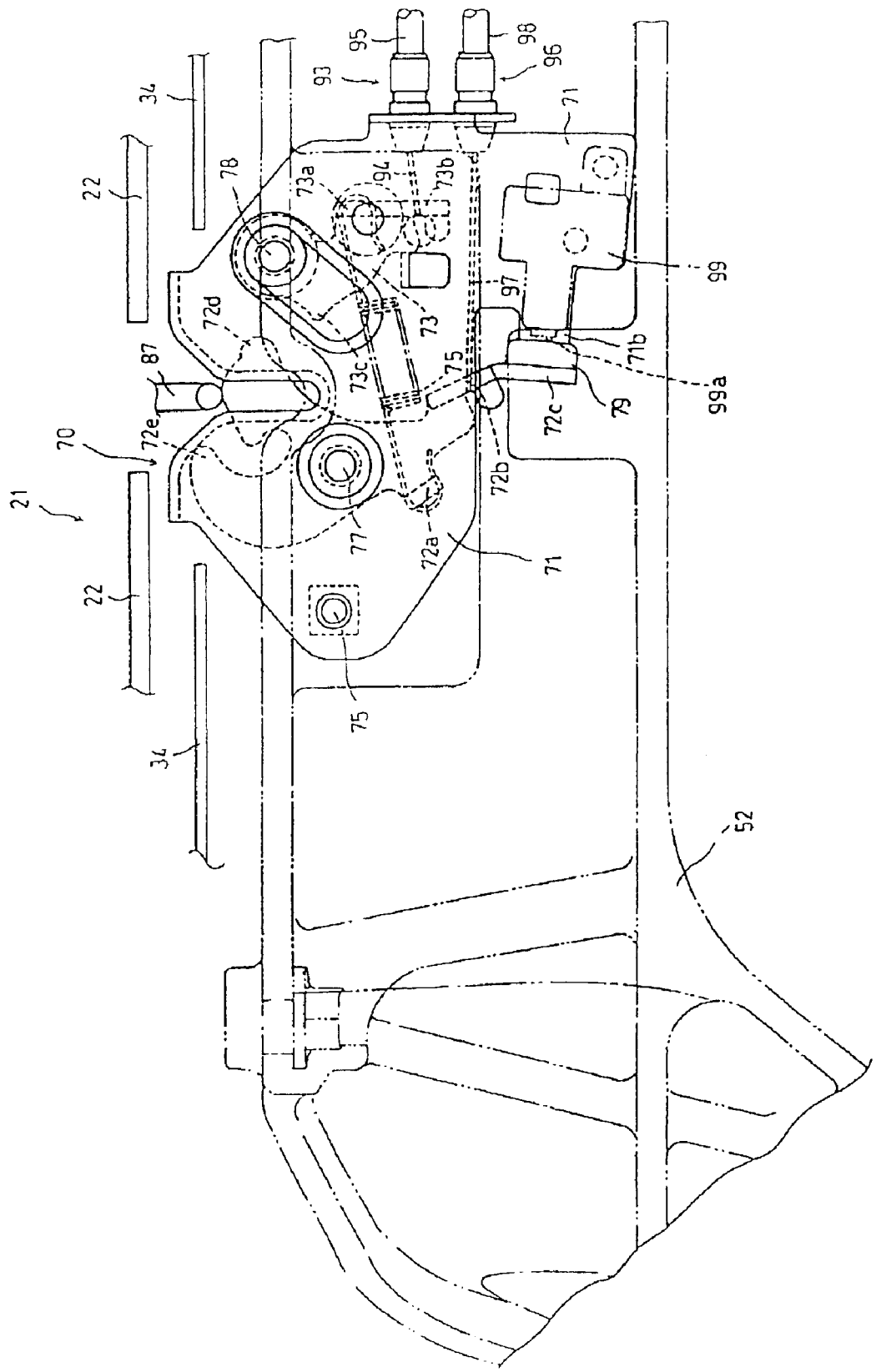
FIG. 16 is a back view of the main seat catch in the unlocked state.

Further, in the housing 71 of the aforementioned main seat catch 70, in a state in which the locking claw 72 is opened and the rubber damping strip 79 formed integrally with the projection 72c of the locking claw 72 abuts against the receiving strip 71b of the housing 71 as shown in FIG. 16. When the movable strip 99a of the push-pull switch 99 is positioned to be pressed by the rubber damping strip 79, the push-pull switch 99 is attached to the housing 71 and the battery cover 40 of the aforementioned helmet storage box 26. The battery 53 in the battery box 41, the illumination unit 59 and the push-pull switch 99 are connected in series. In the locked state shown in FIG. 14, the rubber damping strip 79 moves away from the receiving strip 71b of the housing 71 and the movable strip 99a of the push-pull switch 99. Thus, the push-pull switch 99 is turned off and the illumination lamp 59a in the illumination unit 59 is not illuminate. In the unlocked state shown in FIG. 16, the push-pull switch 99 is turned ON and the illumination lamp 59a in the illumination unit 59 is turned on.

Since the embodiment shown in FIG. 1 through FIG. 21 is constructed as described above, in a state in which the seat 21 is closed and the hooks 87, 88 are engaged and locked with the main seat catch 70 and the sub seat catch 80, respectively, as shown in FIG. 14 and FIG. 15, the hooks 87, 88 cannot be released from the main seat catch 70. The sub seat catch 80 and the seat bottom plate 22 of the seat 21 is brought into intimate contact with the upper opening edge 30 of the helmet storage box 26 via the sealing member 31 and the seat 21 is placed on the box body portion 27. Therefore, as the weight of the rider on the seat 21 and the rider setting behind him/her are received by the rear frame 12 via the seat 21 the rider and the passenger are stably and reliably supported.

As shown in FIG. 14, in a state in which the seat 21 is placed on the helmet storage box 26 and the helmet storage box 26 is hermetically closed by the seat bottom plate 22, the push-pull switch 99 is turned off and the power source of the illumination unit 59 is shut off, and thus a discharge of the battery is suppressed. The seat 21 is reliably fixed by the main seat catch 70 and the sub seat catch 80 at its center portion and the rear portion.

In a state in which the aforementioned helmet storage box 26 is hermetically closed by the seat bottom plate 22 of the seat 21, as shown in FIG. 4, when a key 100 is inserted into the keyhole 91 of the seat lock 90 and turned clockwise, the first cable engaging portion 73b of the stopper member 73 of the main seat catch 70 is pulled towards the right via the inner wire 94 of the first cable 93 as shown in FIG. 16. Thus, the stopper member 73 is turned counterclockwise and the locking projection 73c of the stopper member 73 comes off the engaging projection 72d of the locking claw 72. As a consequent, the locking claw 72 is rotated counterclockwise by a tensile force of tension coil spring 74, and the hook 87 engaged by the claw portion 72e of the locking claw 72 disengages from the claw portion 72e.

Figure 17:
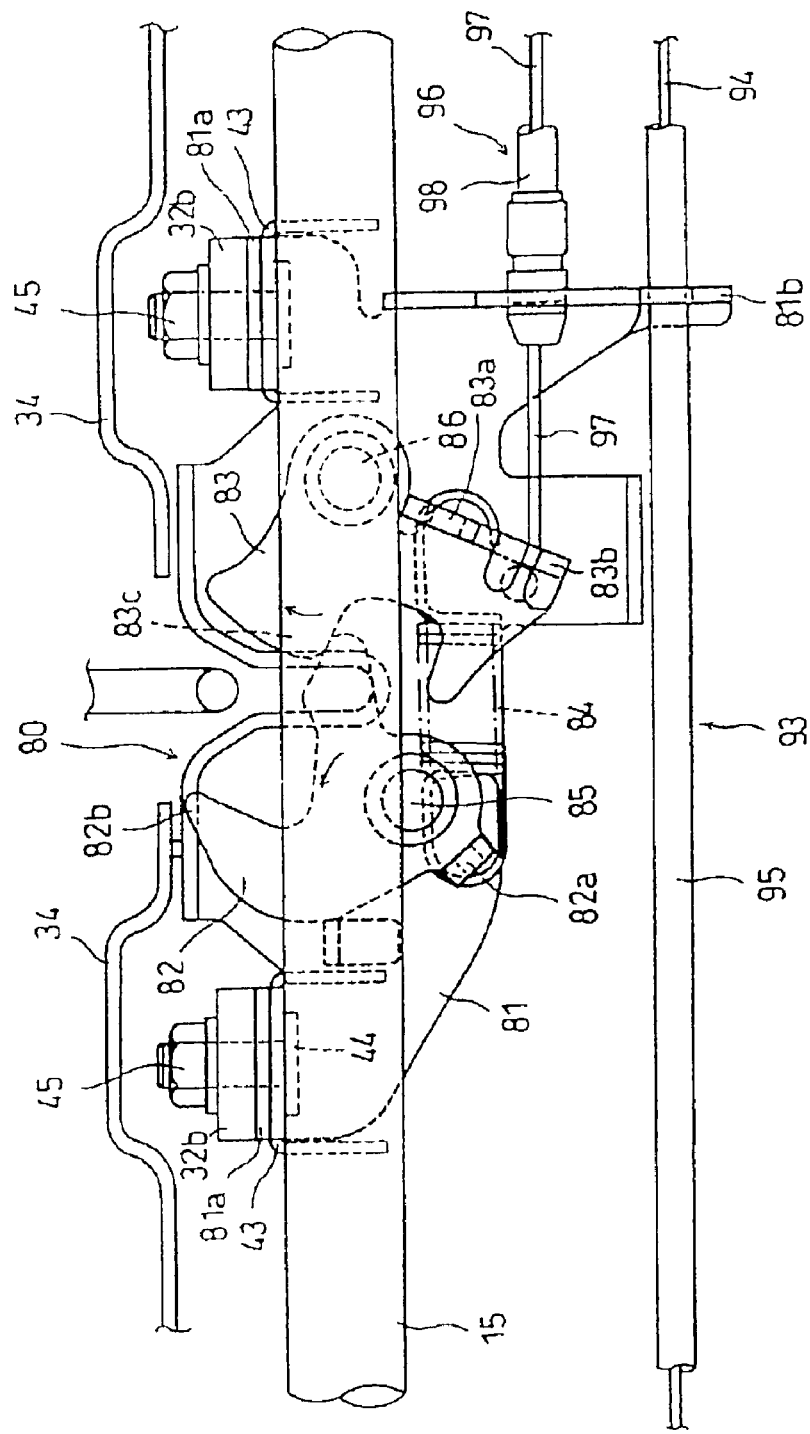
FIG. 17 is a back view of the sub seat catch in the unlocked state.

As shown in FIG. 16, when the locking claw 72 rotates counterclockwise, a tension of the inner wire 97 of the second cable 96 is released. As shown in FIG. 17, the inner wire 97 is unwound at the sub seat catch 80, and thus the driving member 83 is rotated clockwise. Consequently, the locking claw 82 restrained by the moving strip 83c of the driving member 83 via the receiving strip 82c is rotated counterclockwise by a tensile strength of the tension coil spring 84 in association with the clockwise rotation of the driving member 83. The hook 88 engaged by the claw portion 82b of the locking claw 82 disengages from the claw portion 82b and thus is pivoted upwardly about the seat hinge 20 by the aid of a repulsive force of the seat 21 and the damper 25 to open the helmet storage box 26. In a state in which the helmet storage box 26 is opened, two helmets 89 can be stored in fore-and-aft arrangement.

As shown in FIG. 16, in a state in which the locking claw 72 rotates counterclockwise, the seat 21 is pivoted upwardly, and the helmet storage box 26 is opened. The rubber damping strip 79 is formed integrally with the projection 72c of the locking claw 72 abuting against the receiving strip 71b of the housing 71 and the movable strip 99a of the push-pull switch 99. Thus, the push-pull switch 99 is turned on and the illumination lamp 59a in the illumination unit 59 is turned on. Therefore, the interior of the helmet storage box 26 is illuminated and thus the helmet or the like in the helmet storage box 26 easily becomes into view.

Figure 18:
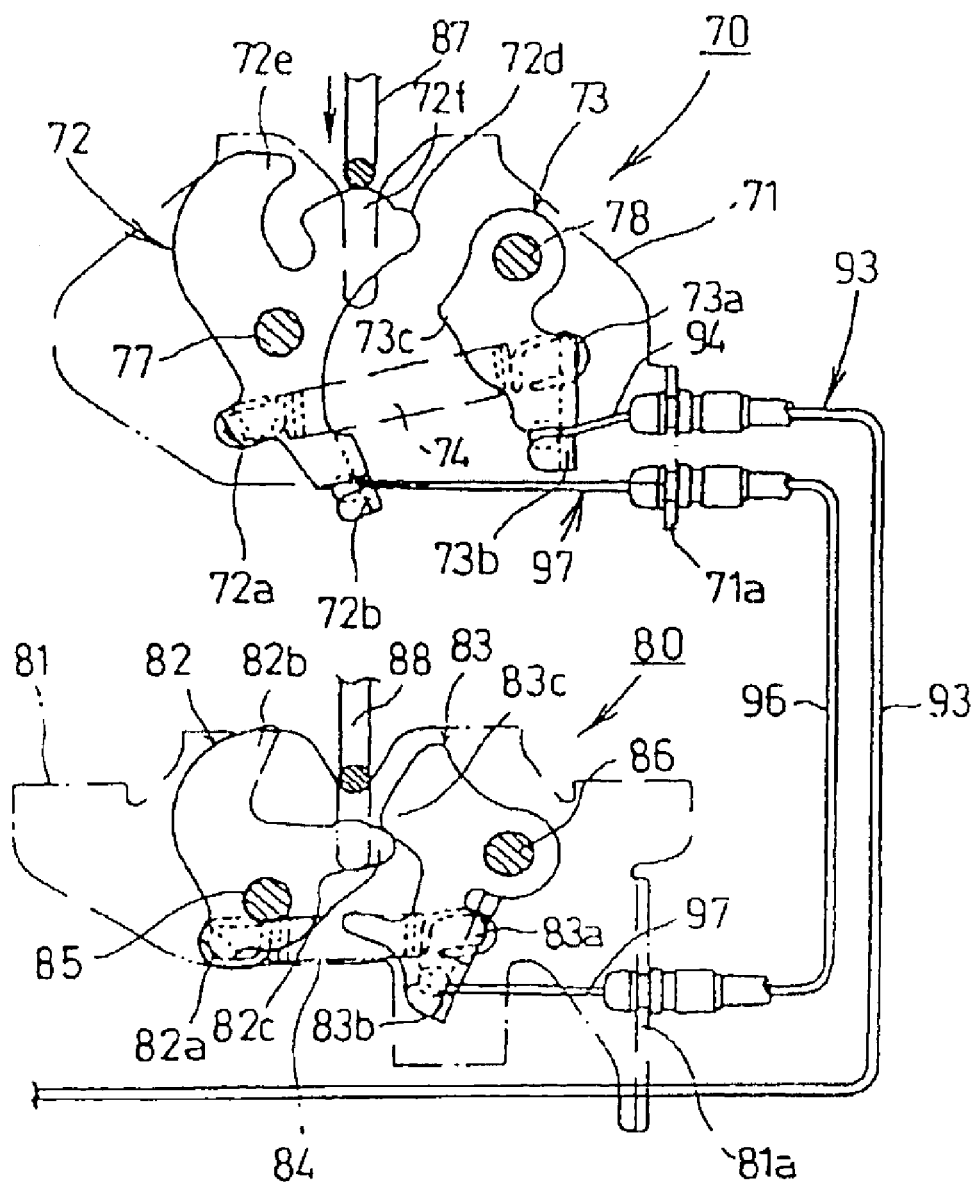
FIG. 18 is an explanatory drawing illustrating the action of the main seat catch and the sub seat catch in the initial stage of transition from the unlocked state to the locked state.
Figure 19:
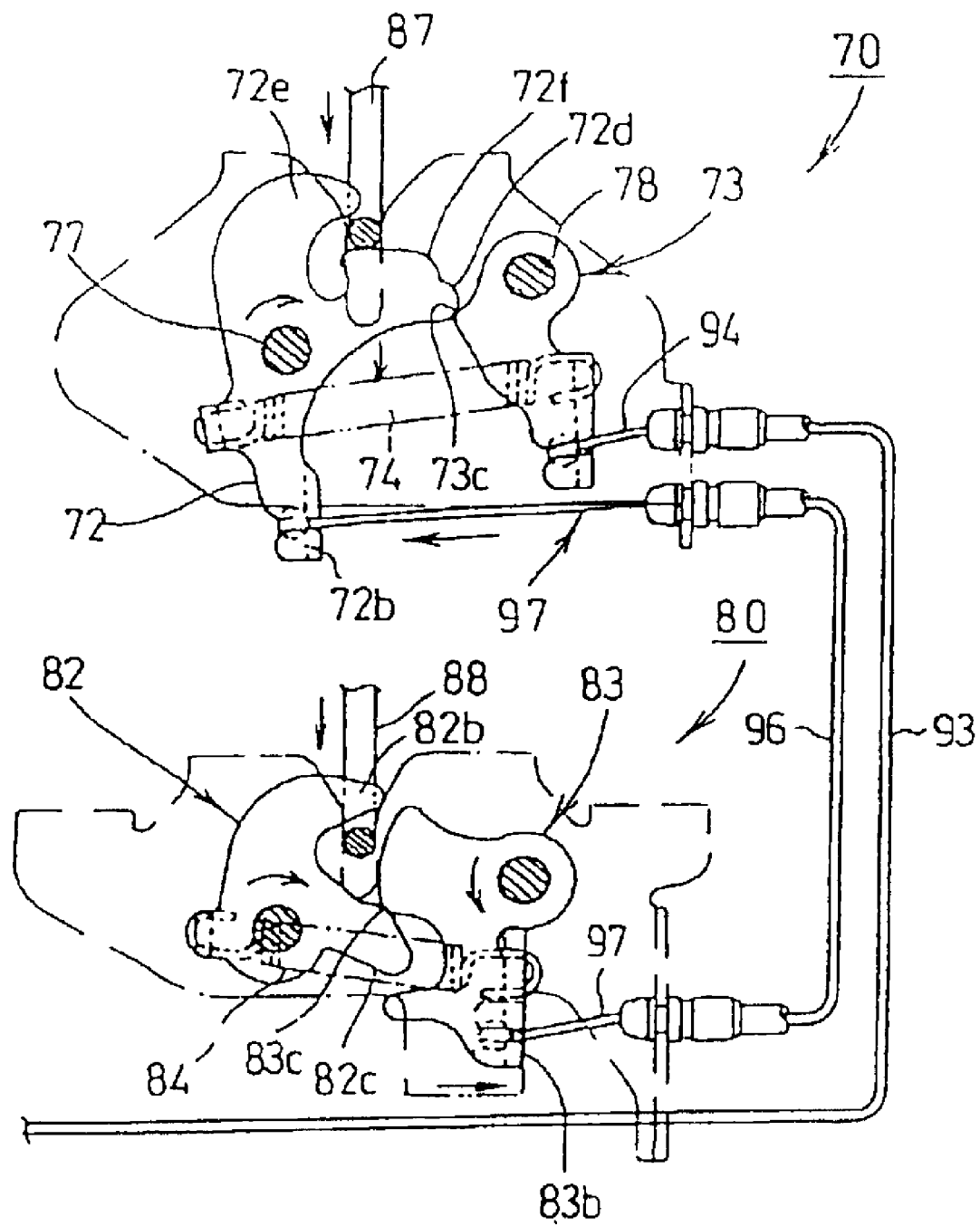
FIG. 19 is an explanatory drawing illustrating the action of the main seat catch and the initial stage of transition from the unlocked state to the locked state of the second stage.
Figure 20:
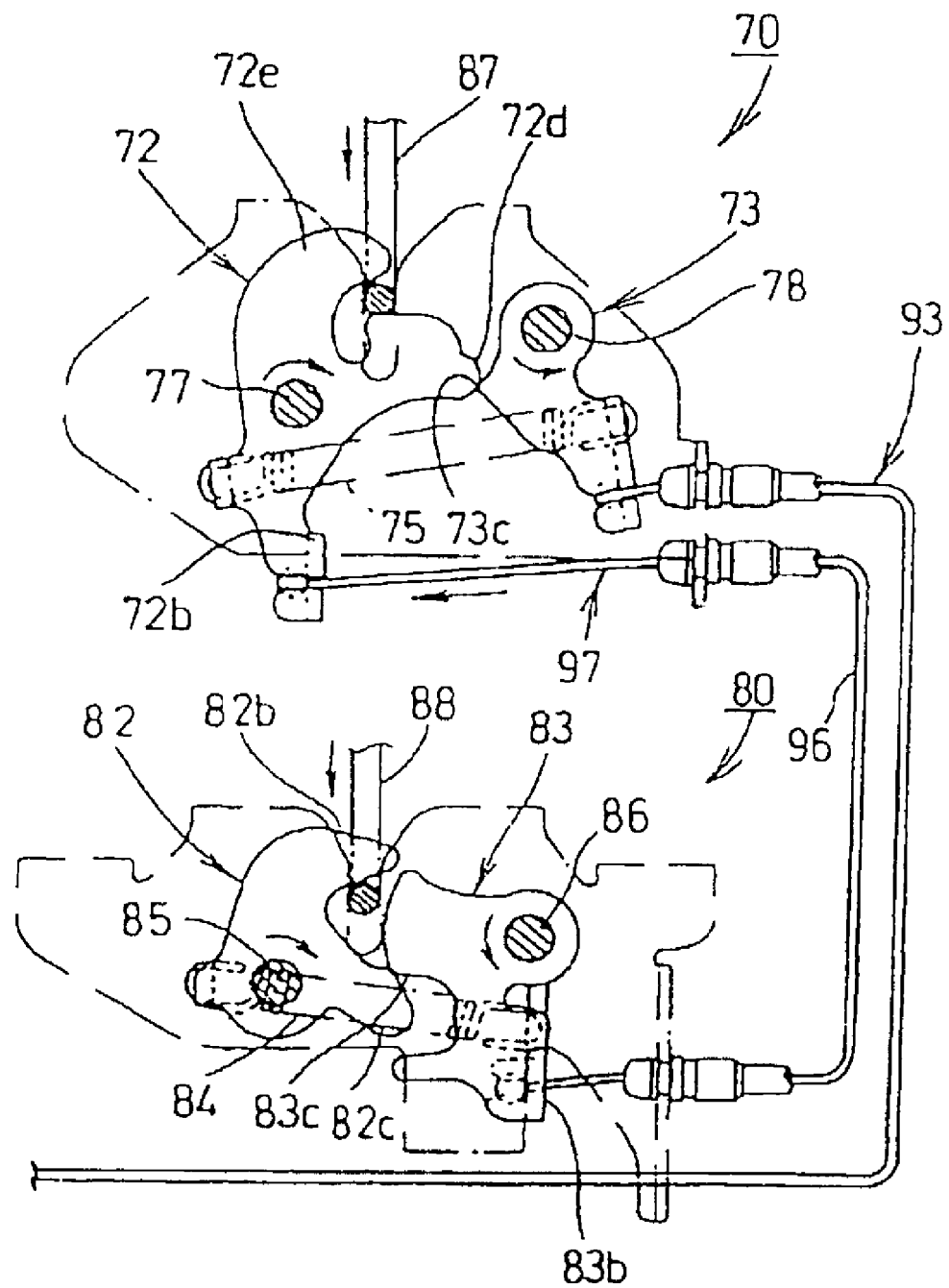
FIG. 20 is an explanatory drawing illustrating the action of main seat catch and the initial stage of transition from the unlocked state to the locked state of the third stage.
Figure 21:
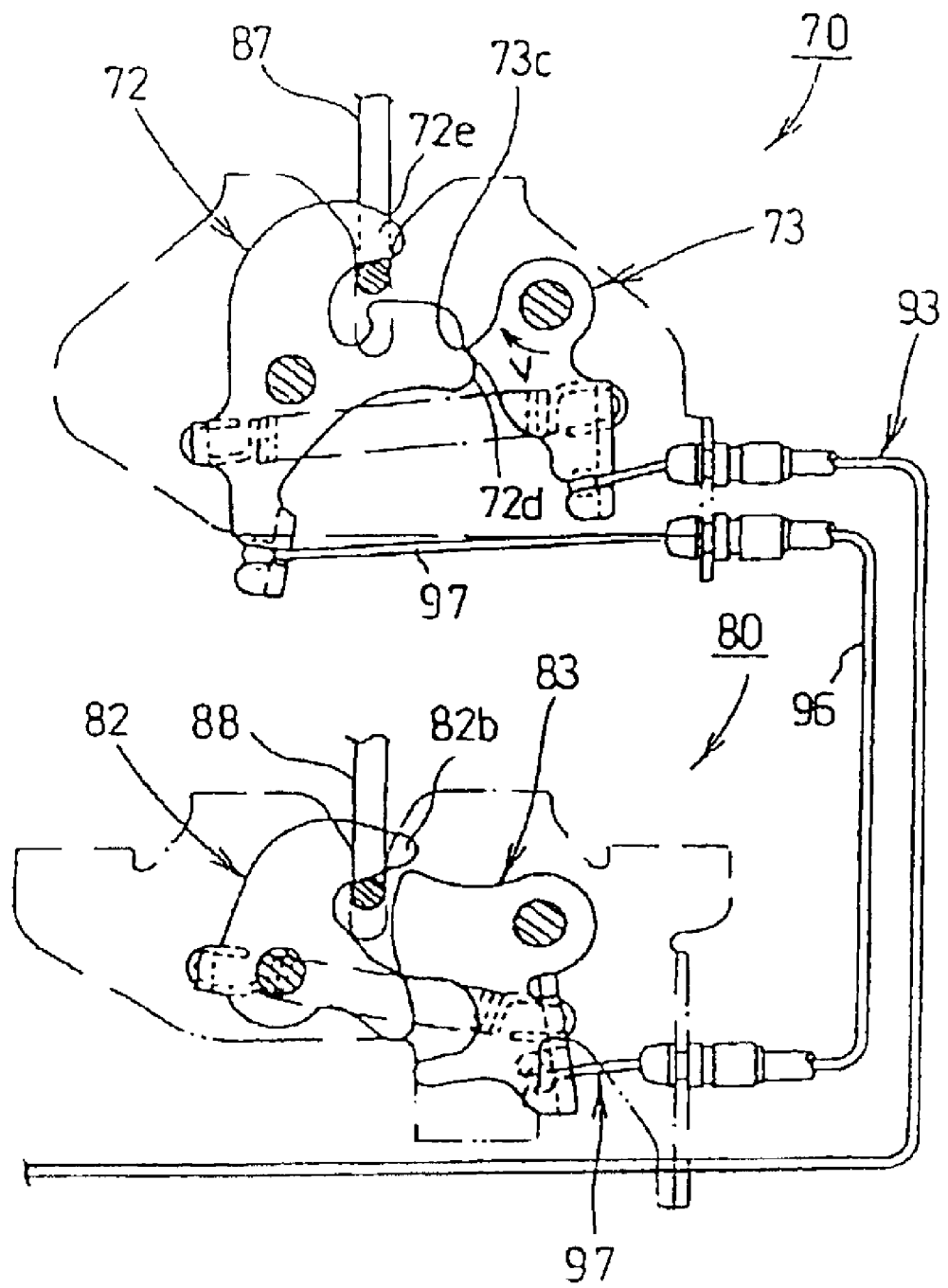
FIG. 21 is an explanatory drawing illustrating the action of main seat catch and the initial stage of transition from the unlocked state to the locked state in the final stage.

As is described thus far, in a state in which the seat 21 is popped upwardly and the helmet storage box 26 is opened, the hooks 87, 88 are moved downwardly by pressing the seat 21 downwardly. As shown in FIG. 18, the hook 87 abuts against the abutting portion 72f of the locking claw 72. When the hook 87 is moved further downwardly, as shown in FIG. 19 and FIG. 20, the locking claw 72 rotates clockwise and the engaging projection 72d of the locking claw 72 is moved over the locking projection 73c of the stopper member 73. As shown in FIG. 21, the stopper member 73 is rotated clockwise by a tensile strength of the tension coil spring 74, and the engaging projection 72d of the locking claw 72 is locked by the locking projection 73c of the stopper member 73 whereby the claw portion 72e of the locking claw 72 is engaged by the hook 87, and the hook 87 is locked by the main seat catch 70.

In association with the action of the aforementioned main seat catch 70, the sub seat catch 80 acts as described below, and the hook 88 is locked by the sub seat catch 80.

In other words, the inner wire 97 exposed from the cable holding bent strip 71a of the housing 71 of the main seat catch 70 is, as shown in FIG. 19, drawn towards the left by clockwise rotation of the locking claw 72 and the inner wire 97 exposed from the cable holding bent strip 81a of the housing 81 of the sub seat catch 80 gets drawn towards the right. As a consequent, the driving member 83 is rotated counterclockwise, the locking claw 82 is rotated clockwise by downward movement of the moving strip 83c of the driving member 83, the claw portion 82b of the locked claw 82 is engaged by the hook 88, and the hook 88 is locked by the sub seat catch 80.

In this case, the rubber damping strip 79, formed integrally with the projection 72c of the locking claw 72, is moved away from the movable strip 99a of the push-pull switch 99 by clockwise rotation of the locking craw 72. Thus, the push-pull switch 99 is turned off and the illumination lamp 59a in the illumination unit 59 is turned off. Consequently, it is not necessary for a rider to turn off the illumination unit 59 manually. Thus, a discharge of the battery due to careless inexecution of the light out of the illumination lamp 59a in the illumination unit 59 is prevented.

Since the push-pull switch 99 is attached integrally to the housing 71 of the main seat catch 70, and is turned on and off by rotation of the locking claw 72 rotatably supported by the housing 71, the illumination lamp 59a in the illumination unit 59 is turned on without fail corresponding to the vertical pivotal movement of the seat 21 only when illumination in the helmet storage box 26 is necessary without being influenced by deformation of the seat 21, deformation of the helmet storage box 26, or deformation of the vehicle body cover 60 at all.

Since the movable strip 99a of the push-pull switch 99 abuts against the rubber damping strip 79, and thus the rubber damping strip 79 is resiliently deformed, impact exerted on the push-pull switch 99 is alleviated, thereby improving durability of push-pull switch 99.

In addition, the main seat catch 70 and the sub seat catch 80 are attached on the main seat catch holding member 52 and the third cross member 15 that are formed integrally with the vehicle body frame 3, the seat 21 or the helmet storage box 26 can be attached and detached irrespective of the main seat catch 70 and the sub seat catch 80.

Figure 22:
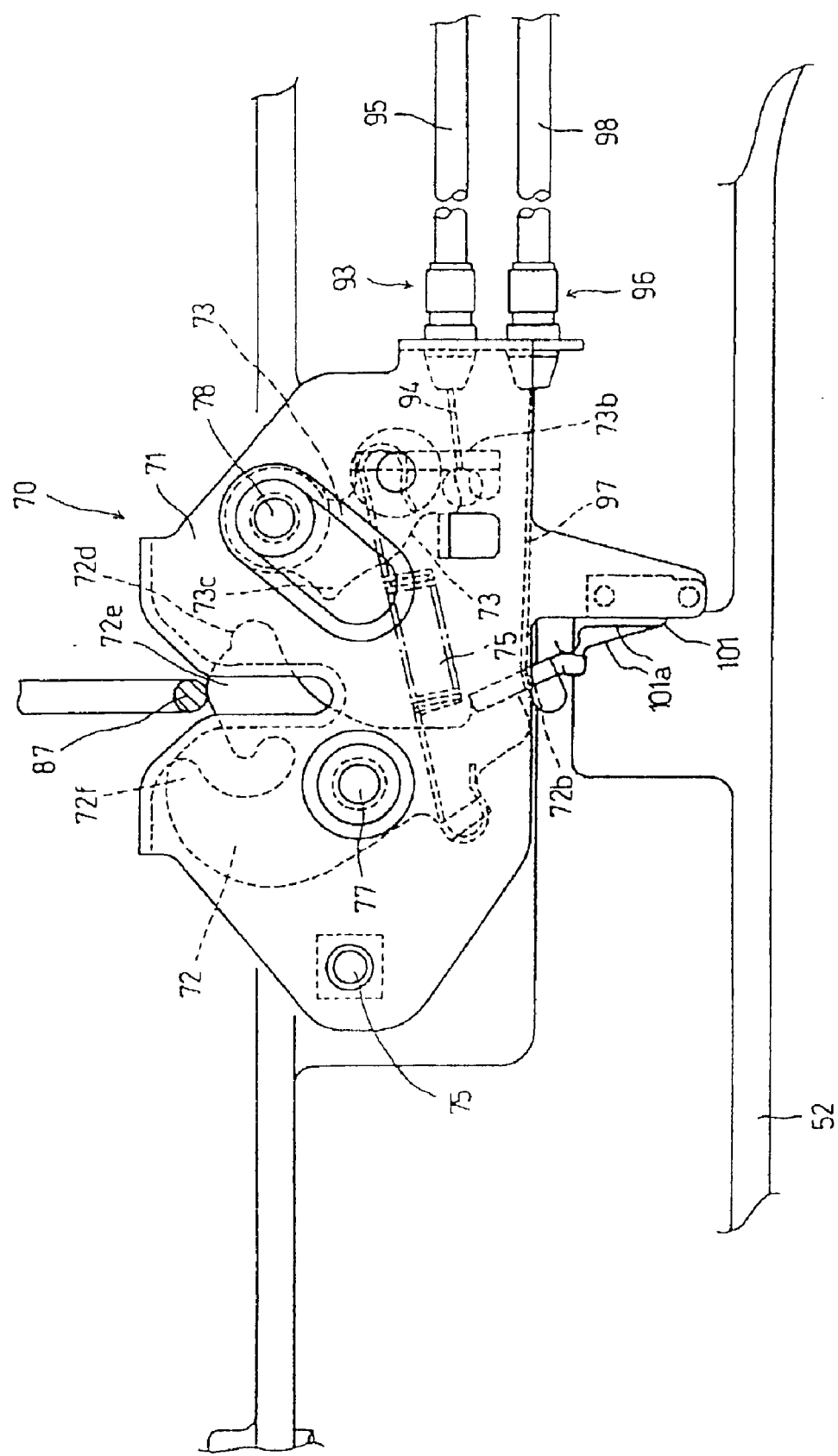
FIG. 22 is a back view of the main seat catch according to another embodiment.

In the embodiment shown in FIG. 1 through FIG. 21, the push-pull switch 99 is provided at the position adjacent to the receiving strip 71b of the housing 71 of the main seat catch 70. However, it is also possible to provide a limit switch 101 instead of the push-pull switch 99 as shown in FIG. 22.

Figure 23:
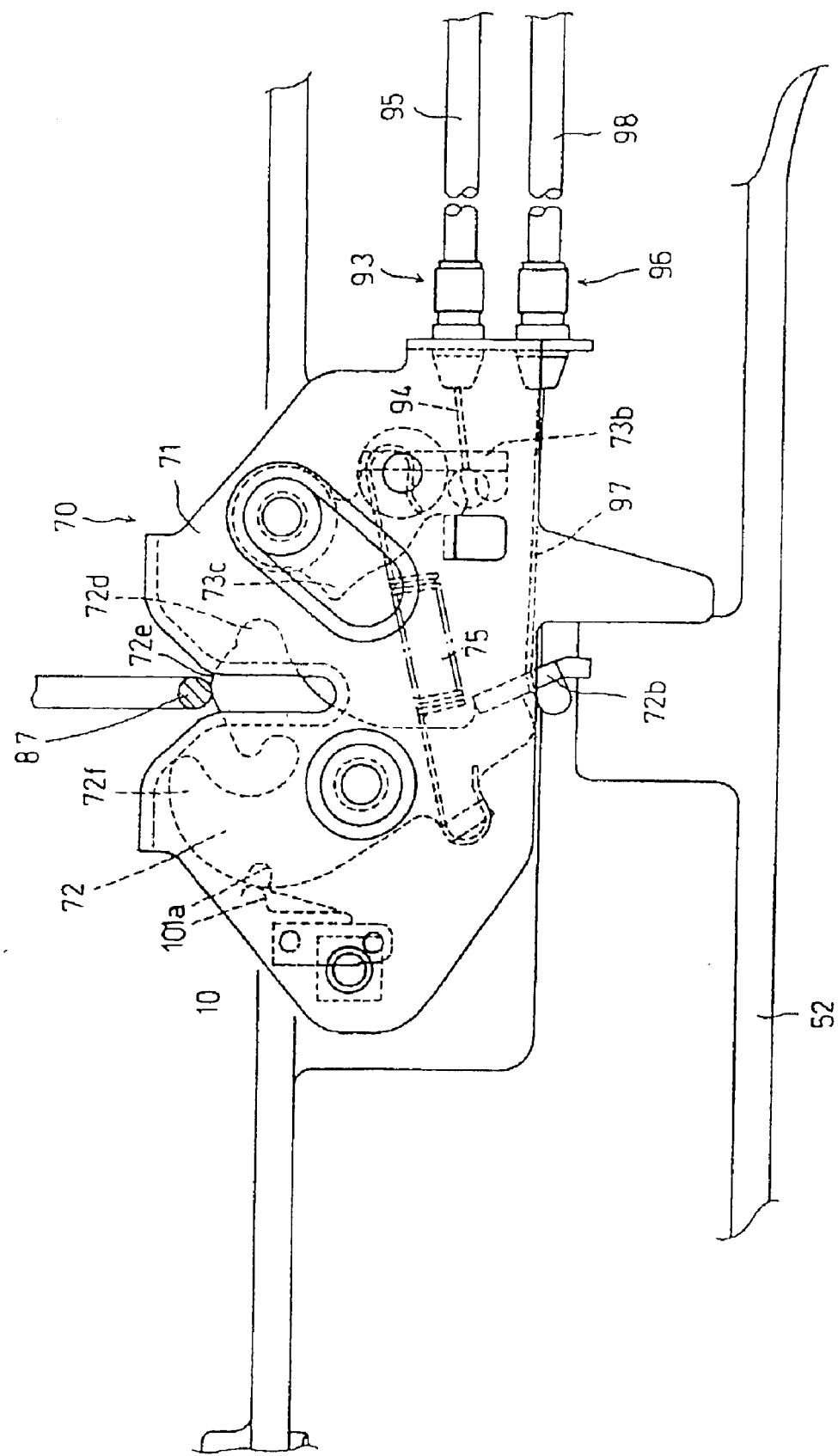
FIG. 23 is a back view of the main seat catch according to still another embodiment.

It is also applicable to provide the limit switch 101 integrally with the housing 71 of the main seat catch 70 at the position so that the movable strip 101a of the limit switch 101 comes into contact with the back portion of the claw portion 72e of the locking claw 72 of the main seat catch 70 in a state in which the main seat catch 70 is opened as shown in FIG. 23. The embodiment shown in FIG. 22 and FIG. 23 exercises the same effects as the embodiment shown in FIG. 1 through FIG. 21. Since the construction of the main seat catch 70 and the sub seat catch 80 in the embodiment shown in FIG. 22 and FIG. 23 is identical to the main seat catch 70 and the sub seat catch 80 in the embodiment shown in FIG. 1 through FIG. 21, they are designated by same reference numerals.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage box illumination device for compact vehicles provided in the storage box to be disposed under a seat of a compact vehicle, comprising:

a seat closure holding means for maintaining the seat in a closed state is provided with an illumination switch for actuating the illumination of an illumination fixture, wherein the seat is adapted to be opened and closed by the operation of a final control element by a rider via a remote control cable in conjunction with the seat closure holding means, and wherein the illumination switch is provided with a movable strip, the movable strip being disposed in a position substantially parallel to the remote control cable.

2. The storage box illumination device for compact vehicles according to claim 1, wherein the illumination switch is disposed on a stopper portion for determining the position of the movable strip.

3. The storage box illumination device for compact vehicles according to claim 2, wherein the seat is adapted to be opened and closed by the operation of a final control element by a rider via a remote control cable in conjunction with the seat closure holding means, and the illumination switch provided with the movable strip of the seat closure holding means is connected to the final control element for the rider via the remote control cable.

4. The storage box illumination device for compact vehicles according to claim 3, wherein the illumination switch is disposed in a position substantially parallel to the remote control cable.

5. The storage box illumination device for compact vehicles according to claim 1, wherein the illumination switch is disposed in the vicinity of the illumination fixture.

6. The storage box illumination device for compact vehicles according to claim 1, wherein the opening is formed on a left upper portion of the upper rear half portion of the storage box and a rib projects from outer peripheral surface of sides other than a lower side of the opening, so that the illumination fixture projects from outside into the storage box.

7. An illumination device for use with a storage box of a vehicle comprising:

a storage box adapted to be mounting on a vehicle;

a storage box closure holding means for maintaining the storage box closure in a closed state;

an illumination fixture for providing illumination within the storage box;

an illumination switch for actuating the illumination of the illumination fixture, said storage box closure means includes said illumination switch, wherein the storage box is adapted to be opened and closed by the operation of a final control element by a rider via a remote control cable in conjunction with a plurality of storage box closure holding means, and wherein the illumination switch is provided on a movable member of one of the storage box closure holding means connected to the final control element for the rider via the remote control cable.

8. The illumination device for use with a storage box of a vehicle according to claim 7, wherein the illumination switch is disposed on a stopper portion for determining the position of a movable member of the seat closure holding means.

9. The illumination device for use with a storage box of a vehicle according to claim 8, wherein the movable member of the illumination switch is disposed in a position substantially parallel to the remote control cable.

10. The illumination device for use with a storage box of a vehicle according to claim 7, wherein the movable member of the illumination switch is disposed in a position substantially parallel to the remote control cable.

11. The illumination device for use with a storage box of a vehicle according to claim 7, wherein the illumination switch is disposed in the vicinity of the illumination fixture.

12. The illumination device for use with a storage box of a vehicle according to claim 7, wherein the opening is formed on a left upper portion of the upper rear half portion of the storage box and a rib projects from outer peripheral surface of sides other than a lower side of the opening, so that the illumination fixture projects from outside into the storage box.

* * * * *